(12) United States Patent (10) Patent No.: US 12,692,950 B2
Tiemeyer (45) Date of Patent: Jul. 28, 2026

(54) MULTIWAY VALVE FOR AN ELECTRIC VEHICLE, THERMAL MANAGEMENT SYSTEM, AND METHOD FOR OPERATING A THERMAL MANAGEMENT SYSTEM

(71) Applicant: HELLA GmbH & Co. KGaA, Lippstadt (DE)

(72) Inventor: Sebastian Tiemeyer, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 218 days.

(21) Appl. No.: 18/540,317

(22) Filed: Dec. 14, 2023

(65) Prior Publication Data

US 2024/0110630 A1 Apr. 4, 2024

Related U.S. Application Data

(63) Continuation of application No. PCT/EP2021/065883, filed on Jun. 14, 2021.

(51) Int. Cl.
*F16K 11/085* (2006.01)
*B60H 1/00* (2006.01)
(Continued)

(52) U.S. Cl.
CPC ...... *F16K 11/0856* (2013.01); *B60H 1/00278* (2013.01); *B60H 1/00485* (2013.01);
(Continued)

(58) Field of Classification Search
CPC ............ F16K 11/0856; B60H 1/00278; B60H 1/00485; B60H 2001/00307; B60L 58/24;
(Continued)

(56) References Cited

U.S. PATENT DOCUMENTS 11,156,300 B2 * 10/2021 Bunda ................... F16K 27/065
11,255,450 B2 * 2/2022 Ledvora .............. F16K 11/0856
(Continued)

FOREIGN PATENT DOCUMENTS

CN 109000026 A * 12/2018 .............. F16K 11/22
CN 110843465 A * 2/2020 ......... B60H 1/00392
(Continued)

OTHER PUBLICATIONS

Machine Translation CN110843465A.*
International Search Report dated Mar. 7, 2022 in corresponding application PCT/EP2021/065883.

*Primary Examiner* — Jenna M Maroney
*Assistant Examiner* — Gustavo A Hincapie Serna
(74) *Attorney, Agent, or Firm* — Muncy, Geissler, Olds & Lowe, P.C.

(57) ABSTRACT

A multiway valve for an electric vehicle, having a housing with at least six housing openings and a valve body. A seal with seal openings, corresponding to the housing openings, is arranged between the housing and the valve body. The valve body has a first plane, which comprises at least two first connection channels, and a second plane, which is parallel to the first plane and which comprises at least two second connection channels. The connection channels can be fluidically connected to at least two of the housing openings of the housing by rotating the valve body into a respective previously determined rotational position. At least one pair of housing openings and the corresponding seal openings extend over the first and second planes such that the aforementioned pair is fluidically paired with the first plane including the first connection channels and with the second plane including the second connection channels.

15 Claims, 38 Drawing Sheets

(51) Int. Cl.

| | |
|---|---|
| *B60L 58/24* | (2019.01) |
| *H01M 10/613* | (2014.01) |
| *H01M 10/625* | (2014.01) |
| *H01M 10/63* | (2014.01) |
| *H01M 10/6568* | (2014.01) |

(52) U.S. Cl.
CPC ........... *B60L 58/24* (2019.02); *H01M 10/613* (2015.04); *H01M 10/625* (2015.04); *H01M 10/63* (2015.04); *H01M 10/6568* (2015.04); *B60H 2001/00307* (2013.01); *H01M 2220/20* (2013.01)

(58) Field of Classification Search
CPC .. H01M 10/613; H01M 10/625; H01M 10/63; H01M 10/6568; H01M 2220/20; F01P 7/165
USPC .......................................................... 165/103
See application file for complete search history.

(56) References Cited

U.S. PATENT DOCUMENTS

| 11,614,173 B2 * | 3/2023 | Kim ...................... F16K 31/061 |
| | | 137/625 |
| 11,698,140 B2 * | 7/2023 | Osmun ................. F16K 5/0605 |
| | | 123/41.08 |
| 11,773,990 B2 * | 10/2023 | Koch .................. F16K 11/0853 |
| | | 137/1 |
| 11,781,662 B2 * | 10/2023 | Schäfer ................. F16K 11/085 |
| | | 137/625.47 |
| 11,796,073 B2 * | 10/2023 | Svejcar ............... F16K 11/0743 |
| 11,971,109 B2 * | 4/2024 | Bewermeyer ............. F01P 7/14 |
| 12,018,773 B2 * | 6/2024 | Ludwig .............. F16K 11/0853 |
| 12,083,856 B2 * | 9/2024 | He ...................... B60H 1/00485 |
| 12,331,839 B2 * | 6/2025 | Hu ......................... F16K 5/0471 |
| 2006/0118066 A1 * | 6/2006 | Martins ............... F16K 11/0856 |
| | | 123/41.08 |
| 2015/0267720 A1 * | 9/2015 | Huang .................. F15B 11/006 |
| | | 137/484.2 |
| 2018/0292016 A1 * | 10/2018 | Ledvora ................ F16K 5/0471 |
| 2019/0226591 A1 * | 7/2019 | Kunzmann .......... F16K 27/067 |
| 2020/0224779 A1 * | 7/2020 | Henker ............. F16K 11/0876 |
| 2021/0010604 A1 * | 1/2021 | Murakami ............... F01P 7/16 |
| 2021/0123374 A1 * | 4/2021 | Geißel .................. F16K 11/085 |
| 2022/0034562 A1 * | 2/2022 | Makihara ............. F25B 25/005 |
| 2022/0090691 A1 * | 3/2022 | Rosa Brusin ....... F16K 11/0873 |
| 2022/0163132 A1 * | 5/2022 | Jeong ................. B60H 1/00921 |
| 2022/0170559 A1 * | 6/2022 | Bohnenstengel ..... F16K 11/074 |
| 2022/0341350 A1 * | 10/2022 | Imiolczyk ............ F16K 5/0421 |
| 2022/0341500 A1 * | 10/2022 | Schmidgall ............. F01P 7/165 |
| 2023/0141026 A1 * | 5/2023 | Hayase ................. F15B 11/126 |
| | | 137/861 |
| 2023/0407980 A1 * | 12/2023 | Wang .................. F16K 11/0853 |

FOREIGN PATENT DOCUMENTS

| CN | 112212032 A | * | 1/2021 | ............. F15B 13/06 |
| DE | 102014108805 A1 | * | 6/2015 | ................ F01P 7/16 |
| EP | 2932142 B1 | * | 6/2021 | ........... F16K 11/076 |

* cited by examiner

MULTIWAY VALVE FOR AN ELECTRIC VEHICLE, THERMAL MANAGEMENT SYSTEM, AND METHOD FOR OPERATING A THERMAL MANAGEMENT SYSTEM

This nonprovisional application is a continuation of International Application No. PCT/EP2021/065883, which was filed on Jun. 14, 2021, and which is herein incorporated by reference.

BACKGROUND OF THE INVENTION

Field of the Invention

The present invention relates to a multiway valve for an electric vehicle, a thermal management system for an electric vehicle, and a method for operating a thermal management system.

Description of the Background Art

Multiway valves, thermal management systems, and methods of this kind are already known from the state of the art in numerous design variants.

Multiway valves are widely used in technology in different embodiments and are used to control complex fluid flows in a variety of applications. It is possible by means of a multiway valve to replace a combination of a plurality of one-way valves. For example, multiway valves are used in the control of complex fluid systems with fluid circuits in vehicles. Newer motor vehicle concepts for land vehicles, such as, for example, hybrid or electric cars, also have such complex fluid systems with fluid circuits. The fluid circuits can be, for example, cooling circuits and/or heating circuits, wherein the same fluid circuit can be designed simultaneously as a cooling circuit and as a heating circuit. Depending on the operating mode, it may be necessary to close or open, connect, or disconnect fluid circuits of such a fluid system. When using conventional multiway valves, a plurality of multiway valves, for example, 3/2- or 4/2-way valves, are then required for this purpose.

This is the starting point for the invention at hand.

SUMMARY OF THE INVENTION

It is therefore an object of the present invention to improve a multiway valve for an electric vehicle, a thermal management system, and a method for operating a thermal management system.

This object is achieved by a multiway valve for an electric vehicle, which is characterized in that at least one pair of housing openings and the corresponding seal openings extends over the first and second planes such that the aforementioned pair is fluidically paired with the first plane comprising the first connection channels and with the second plane comprising the second connection channels and, depending on the rotational position of the valve body, can be fluidically connected to one of the first and/or to one of the second connection channels substantially without any reduction in cross section, relative to a flow from the respective connection channel in the direction of the aforementioned pair. Further, this problem is solved by a thermal management system and by a method for operating a thermal management system. The term "electric vehicle" here can also include so-called hybrid vehicles, therefore, vehicles that have both an electric drive and another type of drive, for example, an internal combustion engine or a fuel cell.

A significant advantage of the invention is in particular that a multiway valve for an electric vehicle, a thermal management system, and a method for operating a thermal management system are improved. By means of the multiway valve of the invention, the thermal management system of the invention, and the method of the invention, it is possible to control a plurality of external flow channels of a fluid system having, for example, a plurality of fluid circuits in a simple manner in terms of design and circuit technology. By means of the invention it is thus possible to reduce a plurality of conventional multiway valves and to replace them with only one multiway valve of the invention. Accordingly, the installation effort and costs as well as the installation space required for this are reduced.

The multiway valve of the invention for an electric vehicle can be freely selected within wide suitable limits according to type, function, material, dimensioning, shape, and arrangement. For example, it is possible to make the housing openings and the corresponding seal openings and/or the clear cross sections of the connection channels substantially rectangular, for example, to reduce pressure losses. In contrast to circular openings and clear cross sections, substantially rectangular openings and clear cross sections can be arranged in a much more space-saving manner, so that, for example, larger flow cross sections are possible compared to circular openings and clear cross sections. The wording "substantially" here can mean that the corners of the housing openings, seal openings, and/or clear cross section of the connection channels can be rounded.

A plurality of the pairs of housing openings and the corresponding seal openings can extend over the first and second planes such that these pairs are fluidically paired with the first plane comprising the first connection channels and with the second plane comprising the second connection channels, and in each case, depending on the rotational position of the valve body, can be fluidically connected to one of the first and/or to one of the second connection channels substantially without any reduction in cross section, relative to a flow from the respective connection channel in the direction of the aforementioned pairs. In this way, it is possible to fluidically pair these pairs with both the first plane of the valve body comprising the first connection channels and with the second plane of the valve body comprising the second connection channels in a simple manner in terms of design and production technology.

At least two pairs of housing openings and the corresponding seal openings can be arranged one above the other such that one of the aforementioned pairs is fluidically paired with the first plane comprising the first connection channels and the other of the aforementioned pairs is fluidically paired with the second plane comprising the second connection channels. This makes it possible to increase the number of pairs while maintaining the same space requirements.

For fluidically connecting at least two of the housing openings, the valve body additionally can have at least one third connection channel, which is fluidically separated from the first and second connection channels, wherein the third connection channel extends over the first and second planes, preferably that the third connection channel is formed as a central channel. In this way, it is possible to realize fluidic connections between the first plane and the second plane by means of the valve body in a particularly simple manner in terms of design and production technology. The preferred embodiment of this refinement has the further advantage that the third connection channel can be realized in a simple manner in terms of design and production technology. For example, the present refinement is essential to fluidically connect pairs to each other, one pair of which is fluidically paired with only the first plane and the other pair of which is fluidically paired with only the second plane. See, for example, the arrangement according to claim 3 in this regard.

The two pairs, arranged one above the other, of housing openings and the corresponding seal openings and the third connection channel can be designed to match one another such that the third connection channel can be fluidically connected to at least one of the two pairs.

The pairs of housing openings and the corresponding seal openings can be arranged symmetrically about the axis of rotation of the valve body such that the centers of gravity of the aforementioned pairs are positioned at 0°, at 60°, at 120°, at 180°, at 240°, and at 300°. This creates a particularly versatile possibility for the fluidic connection of different pairs. The angle specifications refer to a plane perpendicular to the axis of rotation.

An extension of the respective pair of housing openings and the corresponding seal openings, relative to the axis of rotation of the valve body, in each case can correspond to an angle of 30°. In this way, efficient utilization of the available installation space is achieved with simultaneous optimization of the aforementioned openings, namely, openings that are as large as possible under the technical circumstances. The angle specifications again refer to a plane perpendicular to the axis of rotation.

The first and second connection channels can have extensions which, relative to the axis of rotation of the valve body and a contact surface of the valve body with the seal correspond to the following angle groups a and b: a) 90° in each case; b) partly 120°, partly 90°, preferably that the at least one third connection channel has an extension which, relative to the axis of rotation of the valve body and the contact surface of the valve body with the seal corresponds to an angle of 30°. The angle specifications again refer to a plane perpendicular to the axis of rotation. As a result, analogous to the housing openings and seal openings of the aforementioned refinement, an efficient utilization of the available installation space is achieved with simultaneous optimization of the aforementioned clear cross sections of the connection channels, namely, the largest possible clear cross sections under the technical circumstances. Due to the present refinement, different possible variations arise. For example, the extensions of the first connection channels of the first plane can be formed according to angle group a, whereas the extensions of the second connection channels of the second plane can be formed according to angle group b. Of course, the reverse case is also conceivable. Further flexibility in the design of the multiway valve of the invention further results from the division of the individual angles of the angle groups among the respective number of first and/or second connection channels in the single exemplary embodiment. In addition, the extensions of the first and second connection channels may be assigned to angle groups different from each other.

The pairs of housing openings and the corresponding seal openings and the valve body with the connection channels can be designed to match each other in such a way that a fluid flowing in through one of the housing openings can be distributed to at least two other housing openings by means of the valve body depending on the rotational position of the valve body. In this way, the multiway valve of the invention is even more adaptable to the respective requirements of the individual case.

The coolant flowing into the multiway valve from the battery circuit, the drive circuit, or the climate control circuit may only be partially introduced into at least one of the other two circuits by means of the multiway valve or is partially or completely distributed to the other two circuits.

In principle, the thermal management system of the invention can be freely selected also within wide suitable limits according to type, function, material, and dimensioning.

The multiway valve can have a total of seven pairs of housing openings and the corresponding seal openings, wherein the drive circuit is fluidically connected to three of the aforementioned pairs and the battery circuit and the climate control circuit to two of the aforementioned pairs in each case. This enables a thermal management system that is adapted in particular to the requirements of an electric vehicle.

All three circuits, namely, the drive circuit, the battery circuit, and the climate control circuit, can be fluidically connected to each other by means of the multiway valve as a function of the control of the multiway valve, or, that coolant flows through all three aforementioned circuits independently of one another by means of the multiway valve as a function of the control of the multiway valve. In this way, two main operating states are enabled for the operation of the thermal management system of the invention.

Alternatively or in addition thereto, the battery circuit and the climate control circuit can be fluidically connected to each other by means of the multiway valve as a function of the control of the multiway valve, and at the same time coolant flows through the drive circuit independently of the battery circuit and the climate control circuit, or, that the drive circuit and the climate control circuit are fluidically connected to each other by means of the multiway valve as a function of the control of the multiway valve, and at the same time coolant flows through the battery circuit independently of the drive circuit and the climate control circuit, or, that the battery circuit and the drive circuit are fluidically connected to each other by means of the multiway valve as a function of the control of the multiway valve, and at the same time coolant flows through the climate control circuit independently of the battery circuit and the drive circuit. This enables further operating states that are important for the operation of the thermal management system of the invention.

The coolant of the drive circuit may flow only as a function of the control of the multiway valve through a radiator of the drive circuit, which radiator is thermally conductively connected to an open environment of the thermal management system, or through a bypass of the drive circuit, which bypass is connected in parallel to the radiator of the drive circuit. In this way, the functionality of the thermal management system of the invention is additionally improved, because, for example, heat can be exchanged not only in the thermal management system, but heat can also be exchanged between the thermal management system, on the one hand, and the open environment, on the other.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
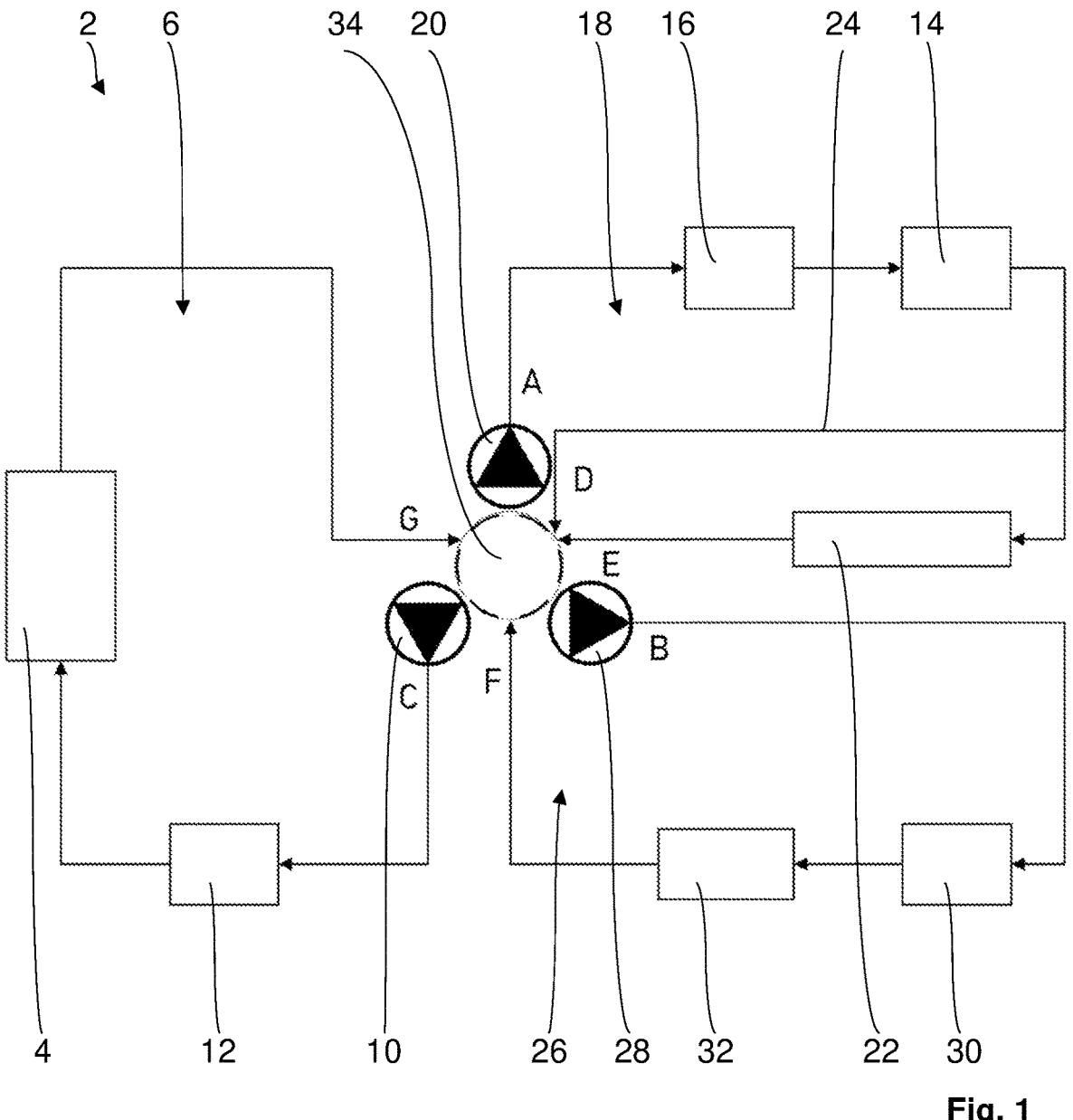
FIG. 1 shows an example of the thermal management system of the invention in a block diagram.

FIGS. 1 to 14*b* show an exemplary embodiment of the thermal management system of the invention with the multiway valve of the invention for carrying out the method of the invention purely by way of example.

Thermal management system 2 is suitably designed for an electric vehicle (not shown in more detail) and comprises a control system (not shown), a battery circuit 6, thermally conductively connected to a traction battery 4 of the electric vehicle and having a coolant pump 10, and a so-called chiller 12, therefore, a cooler, a drive circuit 18 thermally conductively connected to an electric drive 14 of the electric vehicle and power electronics 16 for electric drive 14 and having a coolant pump 20, a radiator 22 thermally conductively connected to an open environment and a bypass 24 to radiator 22, and a climate control circuit 26 thermally conductively connected to a vehicle interior (not shown) of the electric vehicle and having a coolant pump 28, a heater 30, and a heat exchanger 32, wherein battery circuit 6, drive circuit 18, and climate control circuit 26 can each be operated with a coolant (not shown) and can be connected or disconnected from one another in a coolant-conducting manner by means of a single controllable coolant valve formed as a multiway valve 34.

Figure 2A:
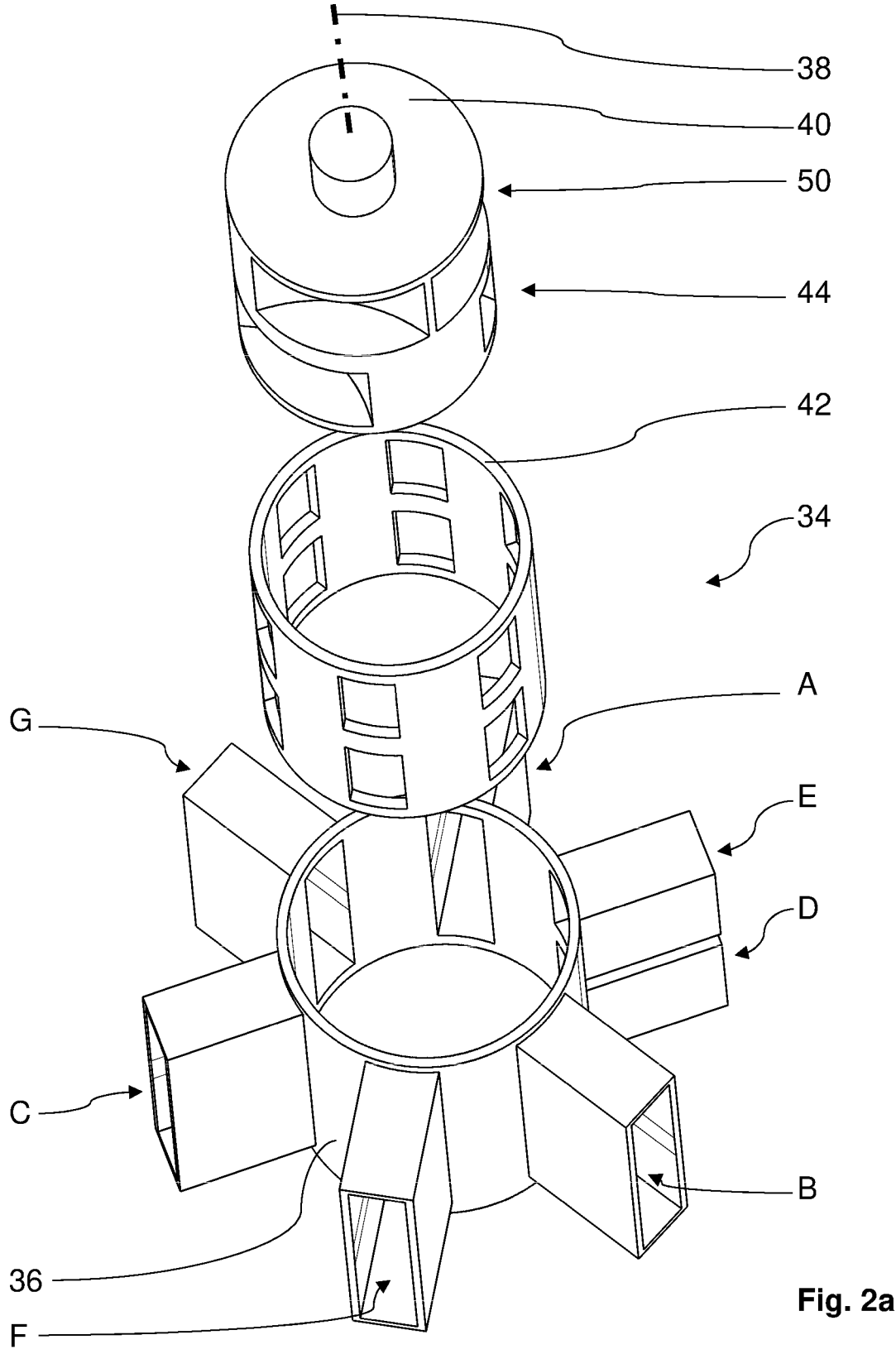
FIG. 2a shows the multiway valve of the example according to the invention in a partial exploded view.
Figure 2C:
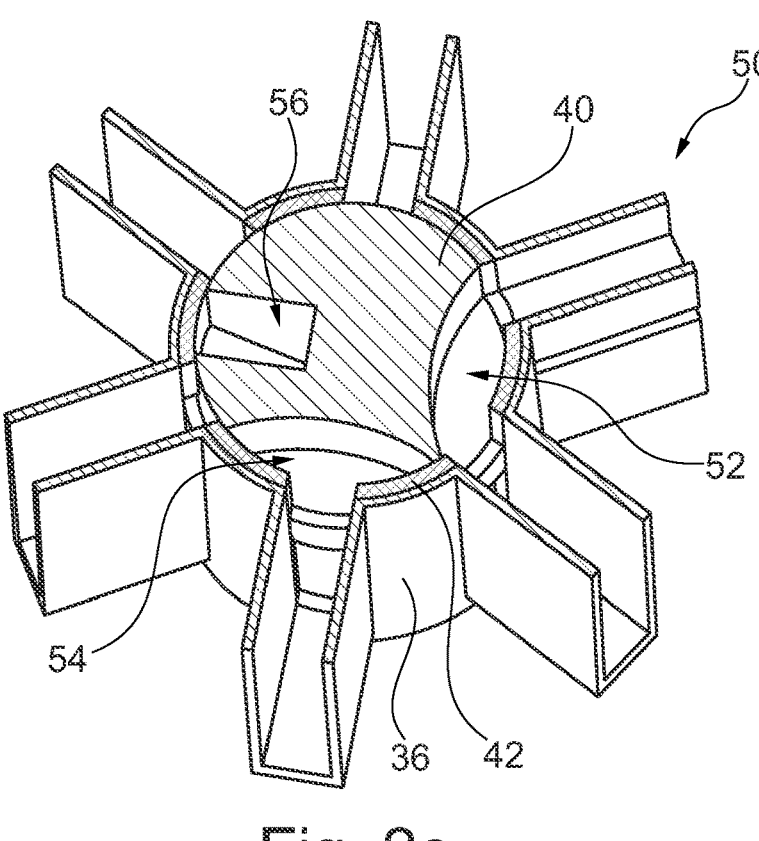
FIG. 2c shows the multiway valve of the example in a partial perspective cross section with a view of the second plane of the valve body.
Figure 2B:
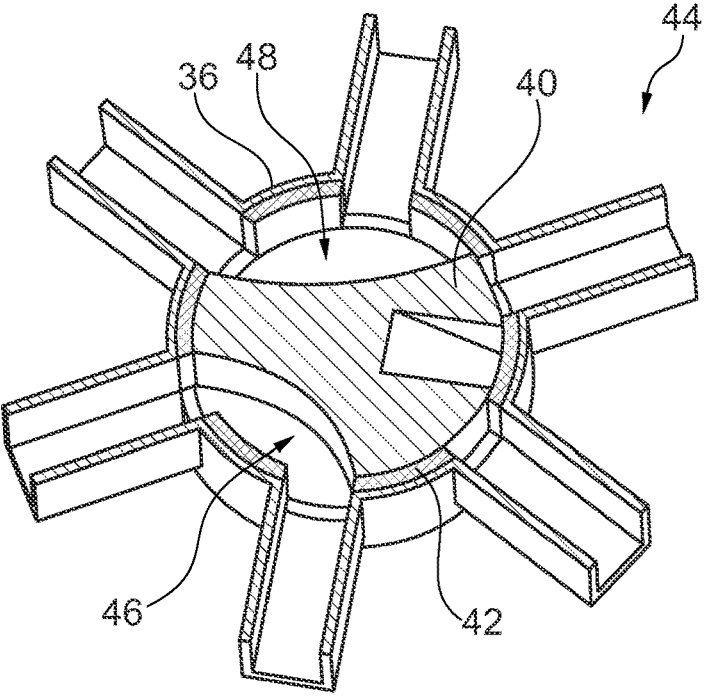
FIG. 2b shows the multiway valve of the example in a partial perspective cross section with a view of the first plane of the valve body.

Multiway valve 34 is shown in more detail in FIGS. 2*a* to 2*c* and comprises a housing 36 having a total of seven housing openings A, B, C, D, E, F, G, each for the fluidic connection to an external flow channel (not shown) for a fluid, namely, the above-mentioned coolant, and a valve body 40, arranged in housing 36 so as to be rotatable about an axis of rotation 38, for the fluidic connection of at least two of the housing openings A to G of housing 36, wherein a seal 42 with seal openings, corresponding to housing openings A to G in housing 36, is arranged between housing 36 and valve body 40 for sealing the fluidic connections relative to the open environment. Because the seal openings correspond to housing openings A to G, the seal openings are not explicitly designated in FIGS. 2*a* to 14*b*. Valve body 40 has a first plane 44 comprising two first connection channels 46, 48 and a second plane 50, parallel to first plane 44 and comprising two second connection channels 52, 54, wherein connection channels 46, 48, 52, 54 are fluidically separated from one another and can each be fluidically connected to at least two of housing openings A to G of housing 36 by means of a rotation of valve body 40 into a respective previously determined rotational position of valve body 40.

According to the invention, in the present exemplary embodiment, a total of five pairs, namely, housing openings A, B, C, F, G, and the corresponding seal openings, extend over the first and second planes 44, 50 such that these pairs A, B, C, F, G are fluidically paired with first plane 44 comprising first connection channels 46, 48 and second plane 50 comprising second connection channels 52, 54 and depending on the rotational position of valve body 40 can be fluidically connected with one of the first and/or one of the second connection channels 46, 48, 52, 54 substantially without any reduction in cross section, based on a flow from the respective connection channels 46, 48, 52, 54 in the direction of the aforementioned pairs A, B, C, F, G. In contrast, two pairs, namely, housing openings E and D and the corresponding seal openings, are arranged one above the other such that one of the aforementioned pairs D is fluidically paired with first plane 44, comprising first connection channels 46, 48, and the other of the aforementioned pairs E with second plane 50, comprising second connection channels 52, 54. The pairs corresponding to housing openings A, D, and E fluidically connect multiway valve 34 to drive circuit 18, the pairs corresponding to housing openings B and F fluidically connect multiway valve 34 to climate control circuit 26, and the pairs corresponding to housing openings C and G fluidically connect multiway valve 34 to battery circuit 6.

In addition to first connection channels 46, 48 and second connection channels 52, 54 for the fluidic connection of at least two of housing openings A to G, valve body 40 additionally has a third connection channel 56 which is fluidically separated from the first and second connection channels 46, 48, 52, 54, wherein third connection channel 56 extends over first and second planes 44, 50, and wherein third connection channel 56 is formed as a central channel. In the present exemplary embodiment, the two pairs, arranged one above the other and corresponding to housing openings E and D, and third connection channel 56 are designed to match each other such that third connection channel 56 can be fluidically connected to both of the aforementioned pairs.

As can be seen from FIGS. 2*a* to 2*c*, housing openings A to G and the corresponding seal openings and the clear cross sections of connection channels 46, 48, 52, 54 are formed substantially rectangular, for example, to reduce pressure losses. In contrast to circular openings and clear cross sections, substantially rectangular openings and clear cross sections can be arranged in a much more space-saving manner, so that, for example, larger flow cross sections are possible compared to circular openings and clear cross sections.

As can be seen further in FIGS. 2*a* to 2*c*, the pairs of housing openings A to G and the corresponding seal openings are arranged symmetrically about the axis of rotation 38 of valve body 40 such that the centers of gravity of the aforementioned pairs are positioned at 0°, at 60°, at 120°, at 180°, at 240°, and at 300°. An extension of the respective pair of housing openings A to G and the corresponding seal openings, relative to the axis of rotation 38 of valve body 40, corresponds here in each case to an angle of 30°. The angle specifications refer to a plane perpendicular to the axis of rotation 38.

In the present exemplary embodiment, the two first connection channels and the two second connection channels 46, 48, 52, 54 as well as third connection channel 56, which fluidically connects the two planes 44, 50, have extensions that correspond to the following angle groups a or b, relative to the axis of rotation 38 of valve body 40 and a contact surface of valve body 40 with seal 42. First connection channels 46, 48 are assigned to angle group b with the angles 120°, 90° and second connection channels 52, 54 are assigned to angle group a with the angles 90°, 90°, wherein the aforementioned extension of first connection channel 46 is assigned an angle of 90°, the aforementioned extension of first connection channel 48 is assigned an angle of 120°, and the aforementioned extension of second connection channel 52 and second connection channel 54 are each assigned an angle of 90°. The extension of third connection channel 56, relative to the axis of rotation 38 of valve body 40 and a contact surface of valve body 40 with seal 42, is assigned an angle of 30°. The angle specifications refer to a plane perpendicular to the axis of rotation 38.

Figure 3A:
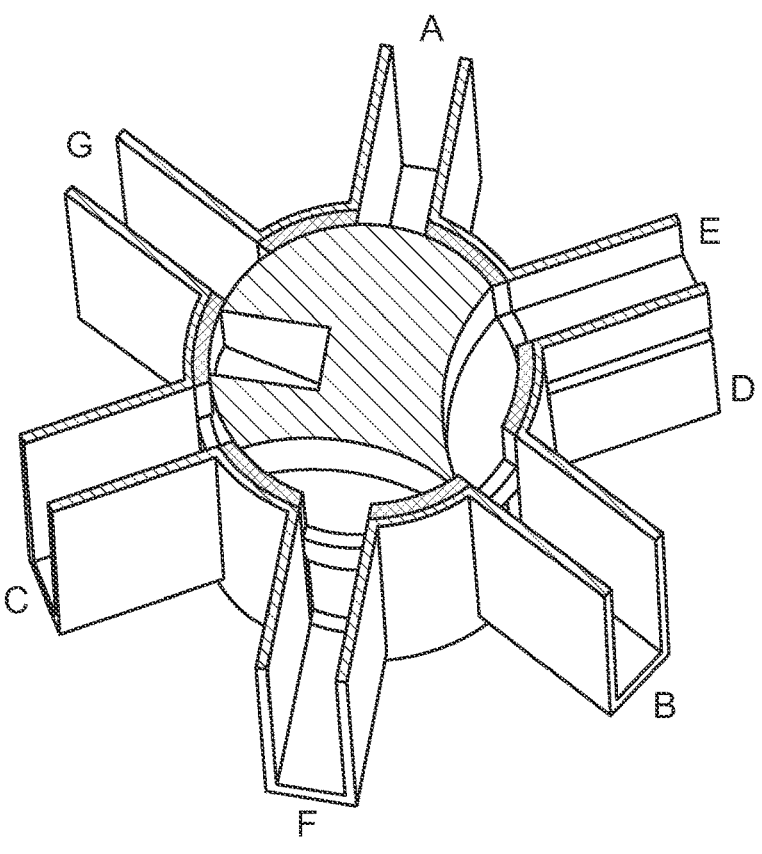
FIG. 3a shows the two planes of the multiway valve in a representation, analogous to FIGS. 2b and 2c, with the valve body in a first rotational position.
Figure 3A:
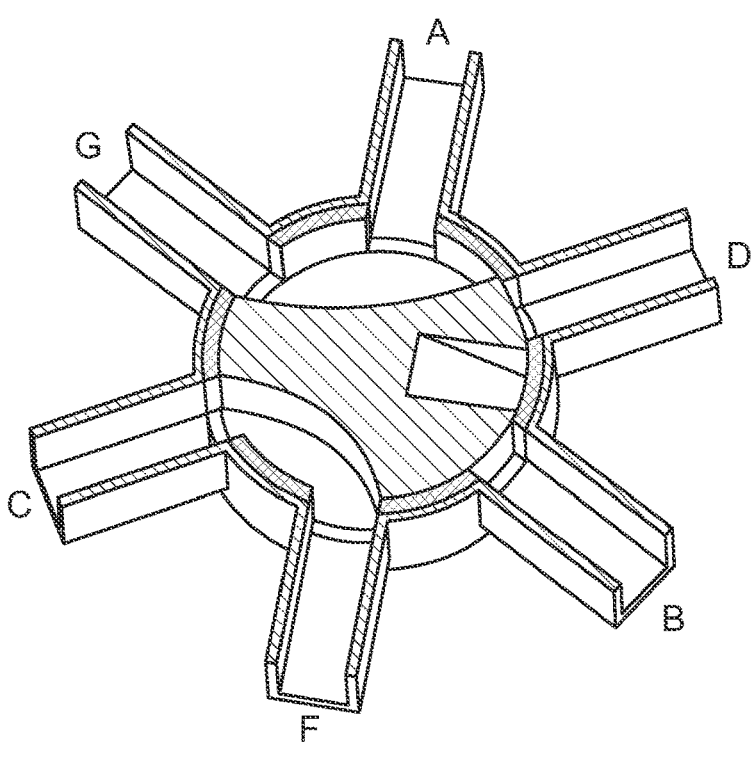
Figure 3B:
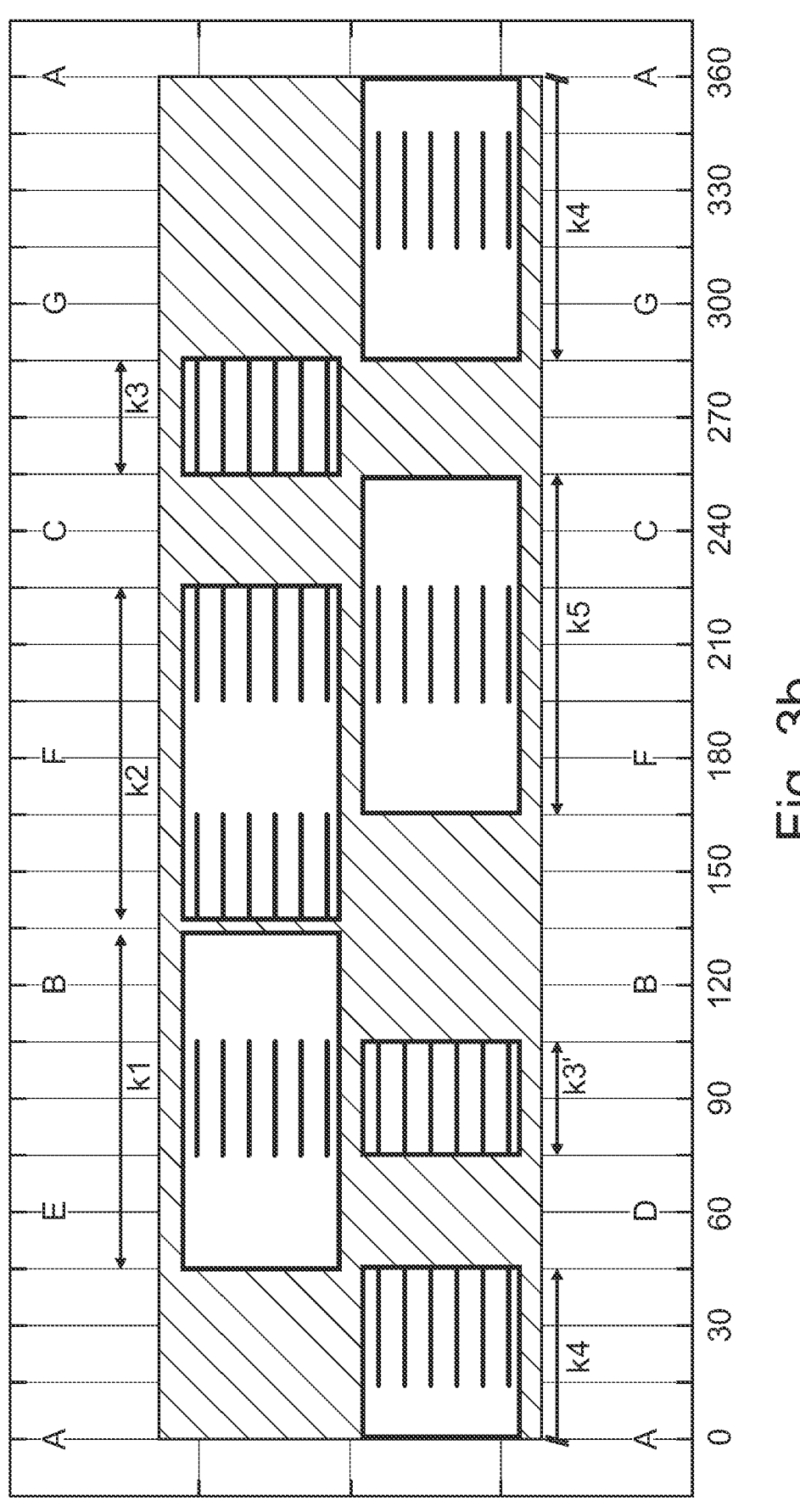
FIG. 3b shows the contact surface, corresponding to FIG. 3a, between the valve body and the housing with the seal in a development view.

The above-mentioned angle specifications can be gathered from the individual development views, for example, FIG. 3b.

However, other assignments and other angle groups are also conceivable in principle. For example, reference is made to FIGS. 14a, 14b, in which a possible different geometry of valve body 40 is shown purely as an example. Firstly, second plane 50 of this valve body 40 has a total of three second connection channels 52, 54, 55 instead of two. Secondly, the extensions of the first and second connection channels 46, 48, 52, 54, 55 are each assigned here to the above-mentioned angle group a, so that each of the aforementioned extensions corresponds to an angle of 90°. The aforementioned angle specifications can be gathered from the development shown in FIG. 14b.

Further, the pairs of housing openings A to G and the corresponding seal openings and valve body 40 with connection channels 46, 48, 52, 54, 56 are designed to match each other such that a fluid flowing in through one of housing openings A to G, therefore, the coolant, can be distributed by means of valve body 40 to at least two other housing openings of housing openings A to G depending on the rotational position of valve body 40.

The mode of operation of the thermal management system of the invention with the multiway valve of the invention and the method of the invention for operating the thermal management system according to the present exemplary embodiment will be explained in more detail hereinbelow with reference to FIGS. 1 to 14b.

Figure 3C:
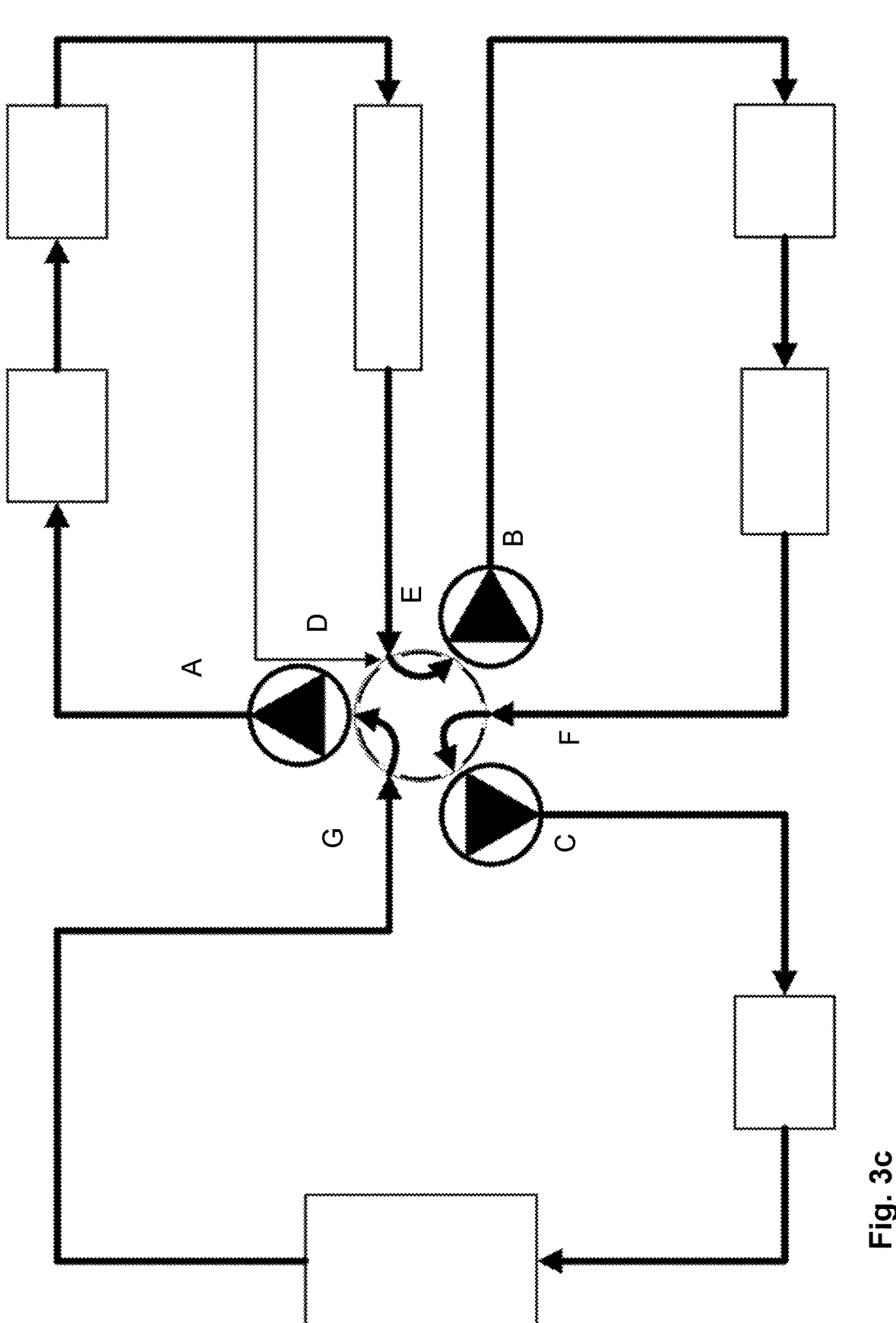
FIG. 3c shows the thermal management system in a representation, analogous to FIG. 1, in an operating state corresponding to the first rotational position of the valve body.

In FIGS. 3a to 3c, a first operating state of thermal management system 2 with multiway valve 34 in a first rotational position of valve body 40 is shown in three corresponding illustrations. The first rotational position of valve body 40 is particularly apparent from FIG. 3a, which illustrates multiway valve 34 with a view of first plane 44 of valve body 40 as well as second plane 50 of valve body 40. A development of the contact surface between valve body 40, on the one hand, and seal 42, on the other, is shown in FIG. 3b. On the one hand, the angle degrees from 0° to 360° are plotted on the horizontal axis of the diagram for easier orientation, where 0° and 360° are identical. On the other hand, the pairs of housing openings A to G and the corresponding seal openings are plotted. The diagonal hatching here represents valve body 40, whereas the horizontal hatching represents seal 42. Connection channels 46, 48, 52, 54, 56 of valve body 40 are each represented by a rectangle. As can be seen from FIG. 3a and also from FIG. 3b, the pairs corresponding to housing openings E and B are fluidically connected by means of second connection channel 52, the pairs corresponding to housing openings A and G by means of first connection channel 48, and the pairs corresponding to housing openings C and F by means of first connection channel 46. In FIG. 3c, it is further shown how the first rotational position of multiway valve 34 affects the corresponding first operating state of thermal management system 2. Accordingly, the first operating state corresponds to a connection of all three circuits 6, 18, 26 into a single overall circuit, wherein the coolant from drive circuit 18 flows through radiator 22 into multiway valve 34.

In FIGS. 4a to 13c, a further ten operating states of thermal management system 2 are shown analogous to the first operating state of thermal management system 2 according to FIGS. 3a to 3c. Accordingly, reference can be made as far as possible to the above detailed explanations of the first operating state of thermal management system 2. FIGS. 4a to 13c are therefore only briefly explained below.

Figure 4A:
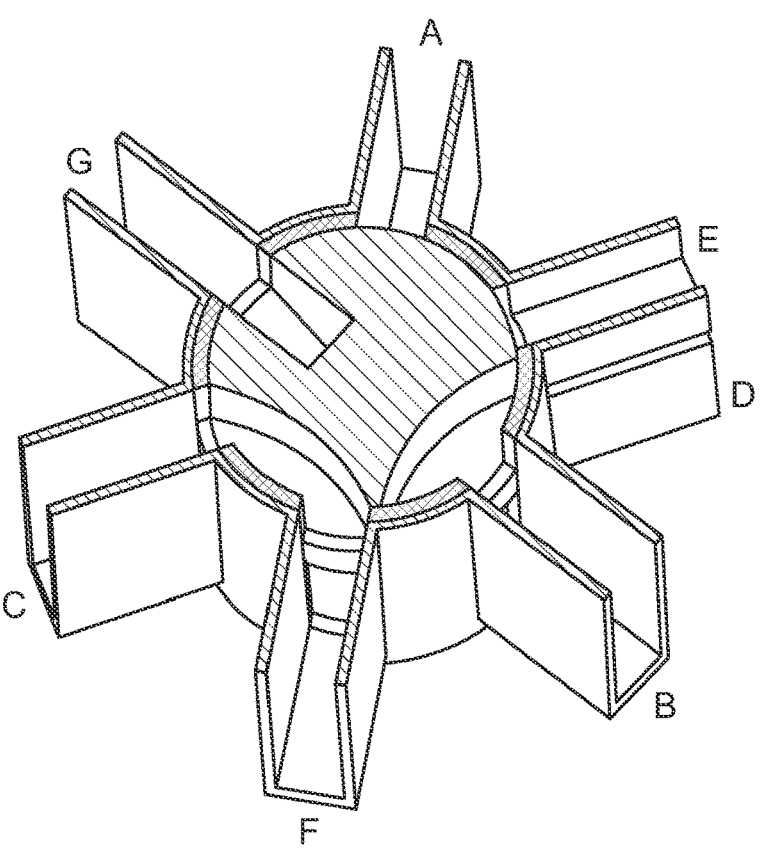
FIG. 4a shows the two planes of the multiway valve in a representation, analogous to FIGS. 2b and 2c, with the valve body in a second rotational position.
Figure 4A:
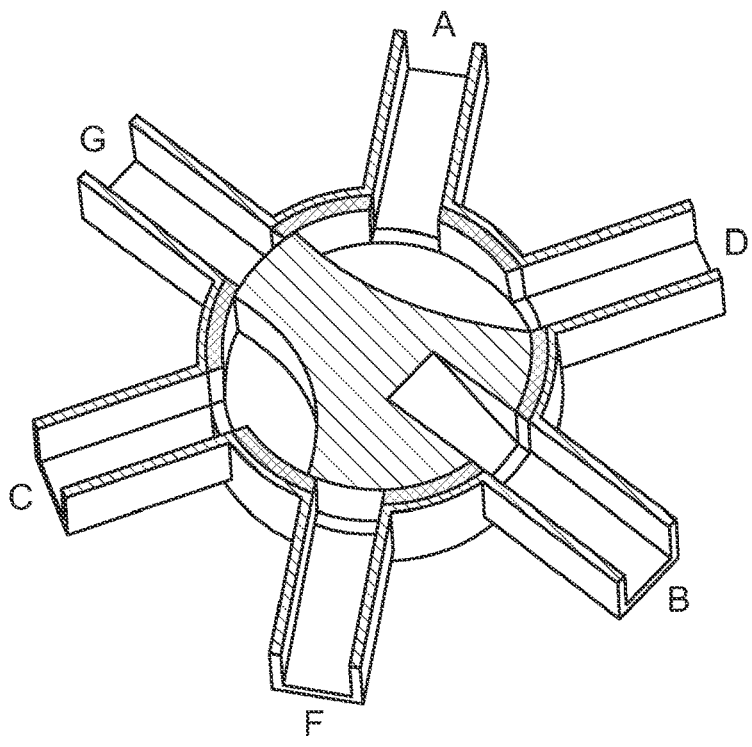
Figure 4B:
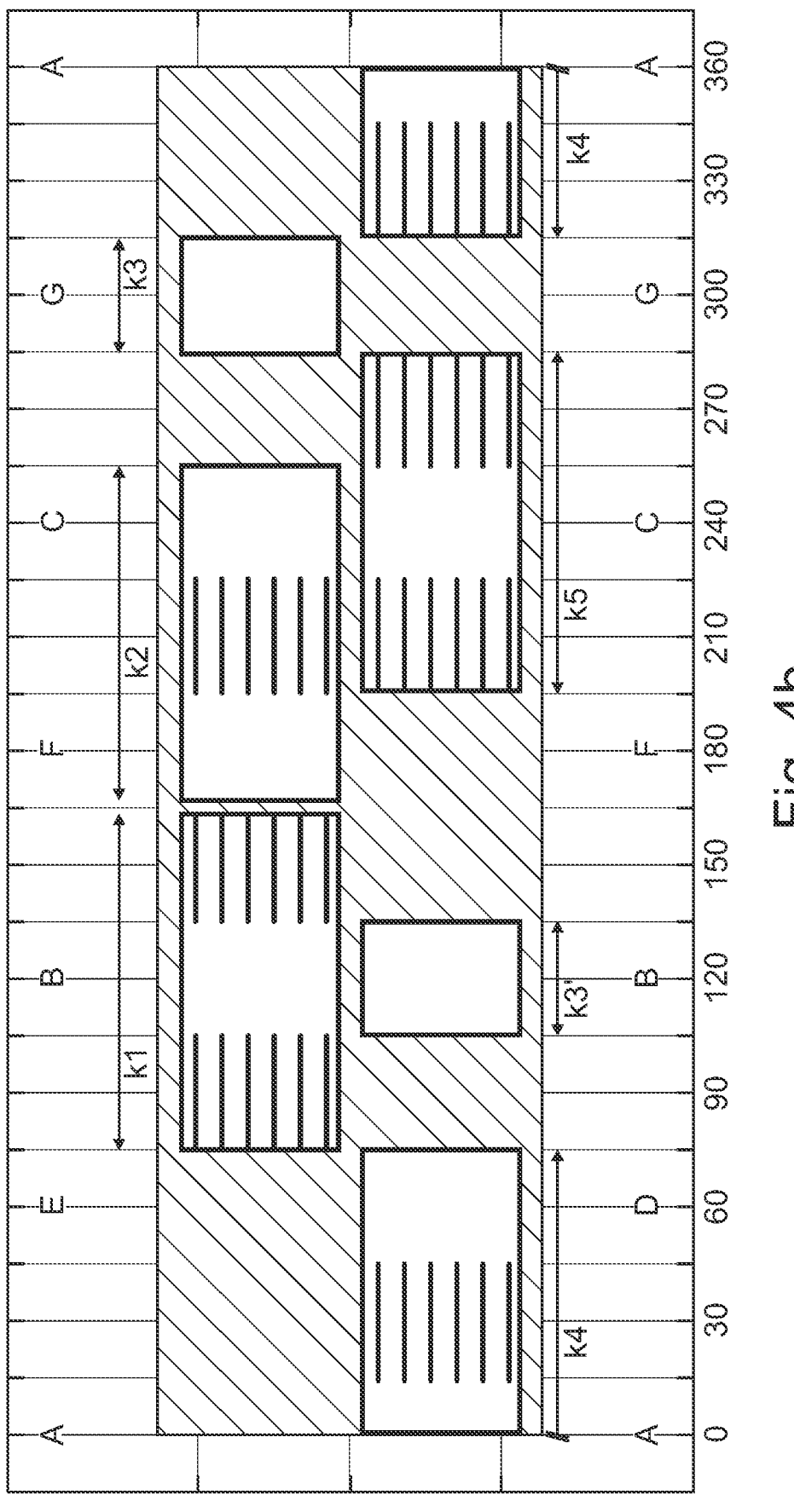
FIG. 4b shows the contact surface, corresponding to FIG. 4a, between the valve body and the housing with the seal in a development view.
Figure 4C:
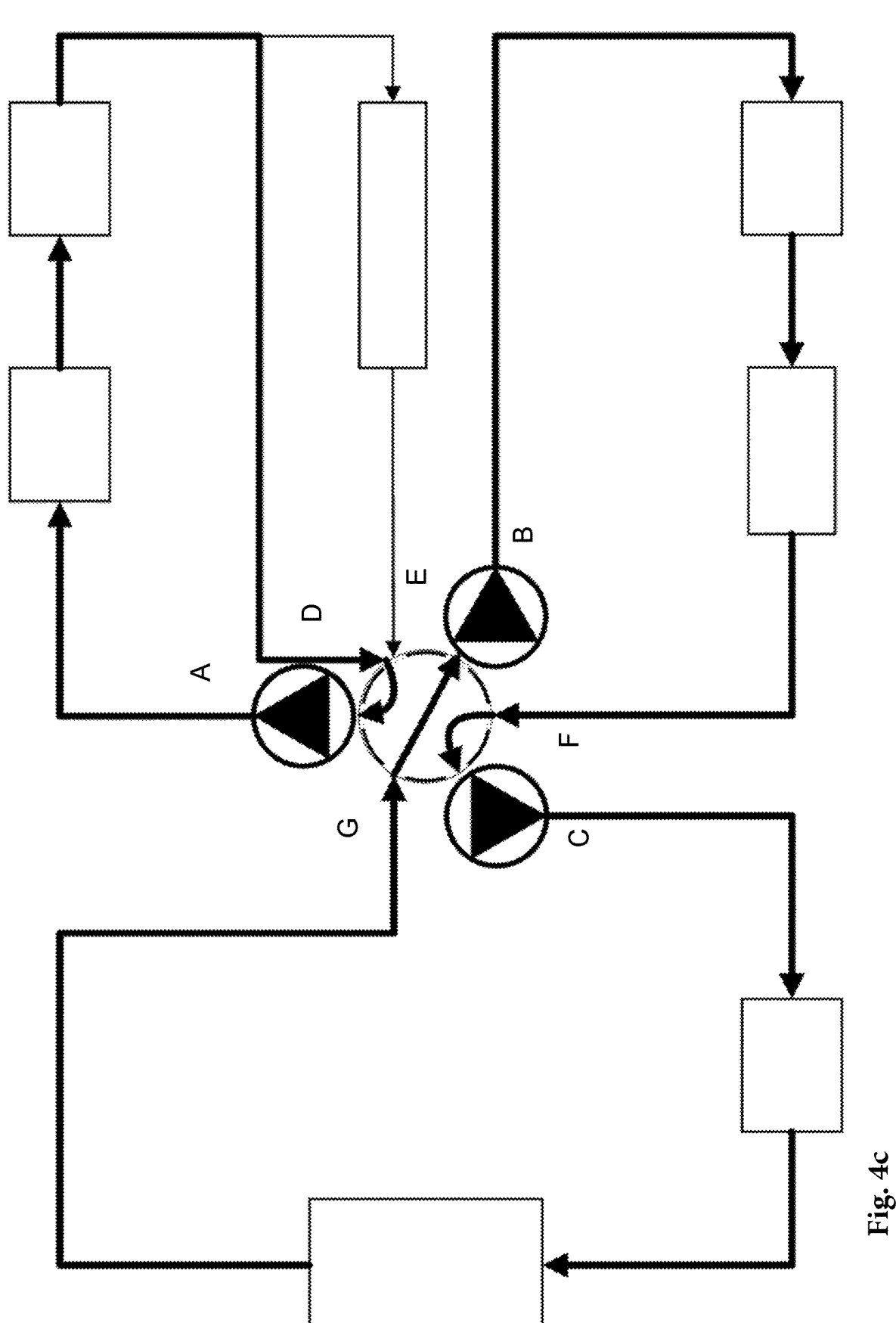
FIG. 4c shows the thermal management system in a representation, analogous to FIG. 1, in an operating state corresponding to the second rotational position of the valve body.

FIGS. 4a to 4c show a second operating state of thermal management system 2 corresponding to a second rotational position of valve body 40 of multiway valve 34. In the second operating state, the pairs corresponding to housing openings F and C, G and B, and D and A are fluidically connected to each other. This corresponds to a connection of battery circuit 6 with climate control circuit 26 to form an overall circuit, whereas drive circuit 18 is flowed through separately therefrom using bypass 24.

Figure 5A:
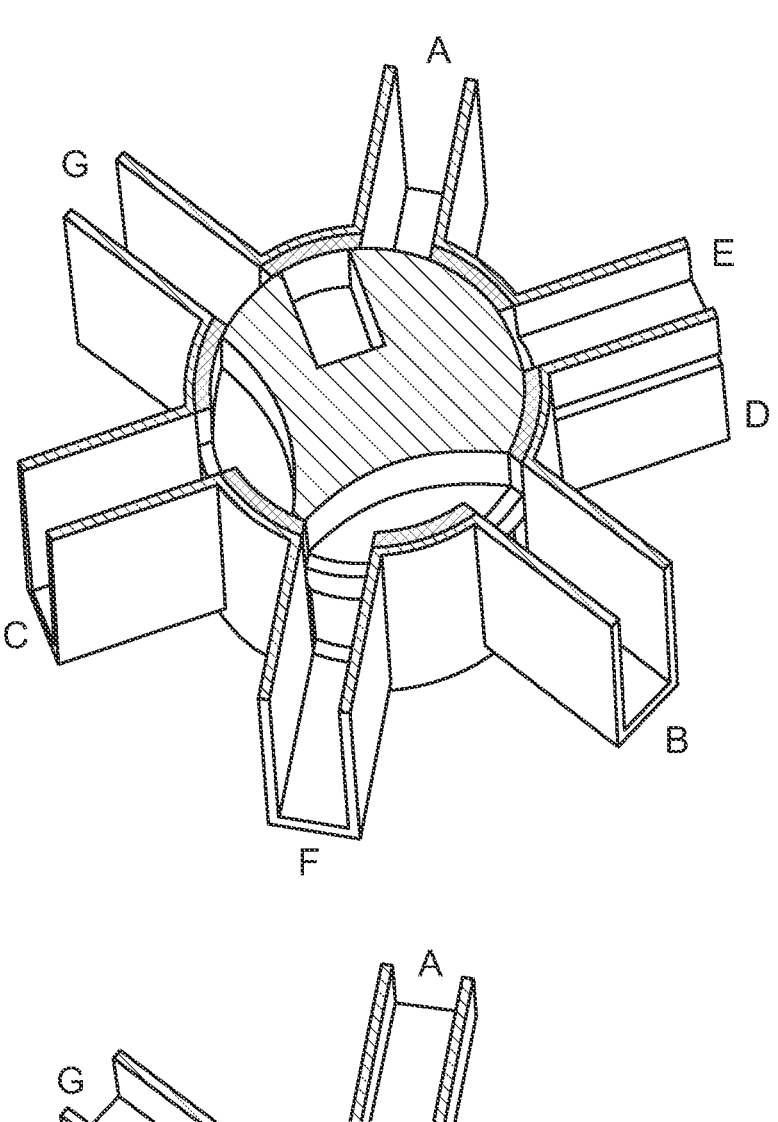
FIG. 5a shows the two planes of the multiway valve in a representation, analogous to FIGS. 2b and 2c, with the valve body in a third rotational position.
Figure 5A:
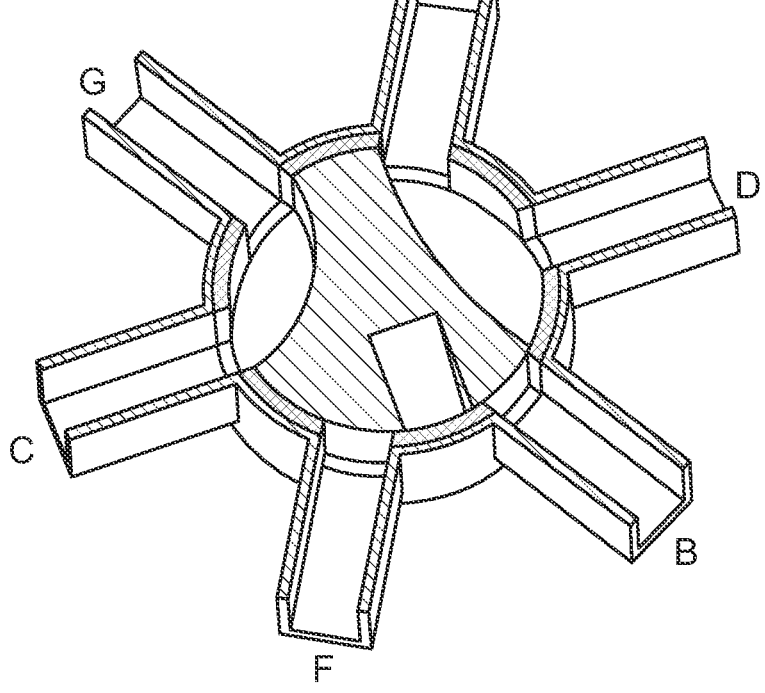
Figure 5B:
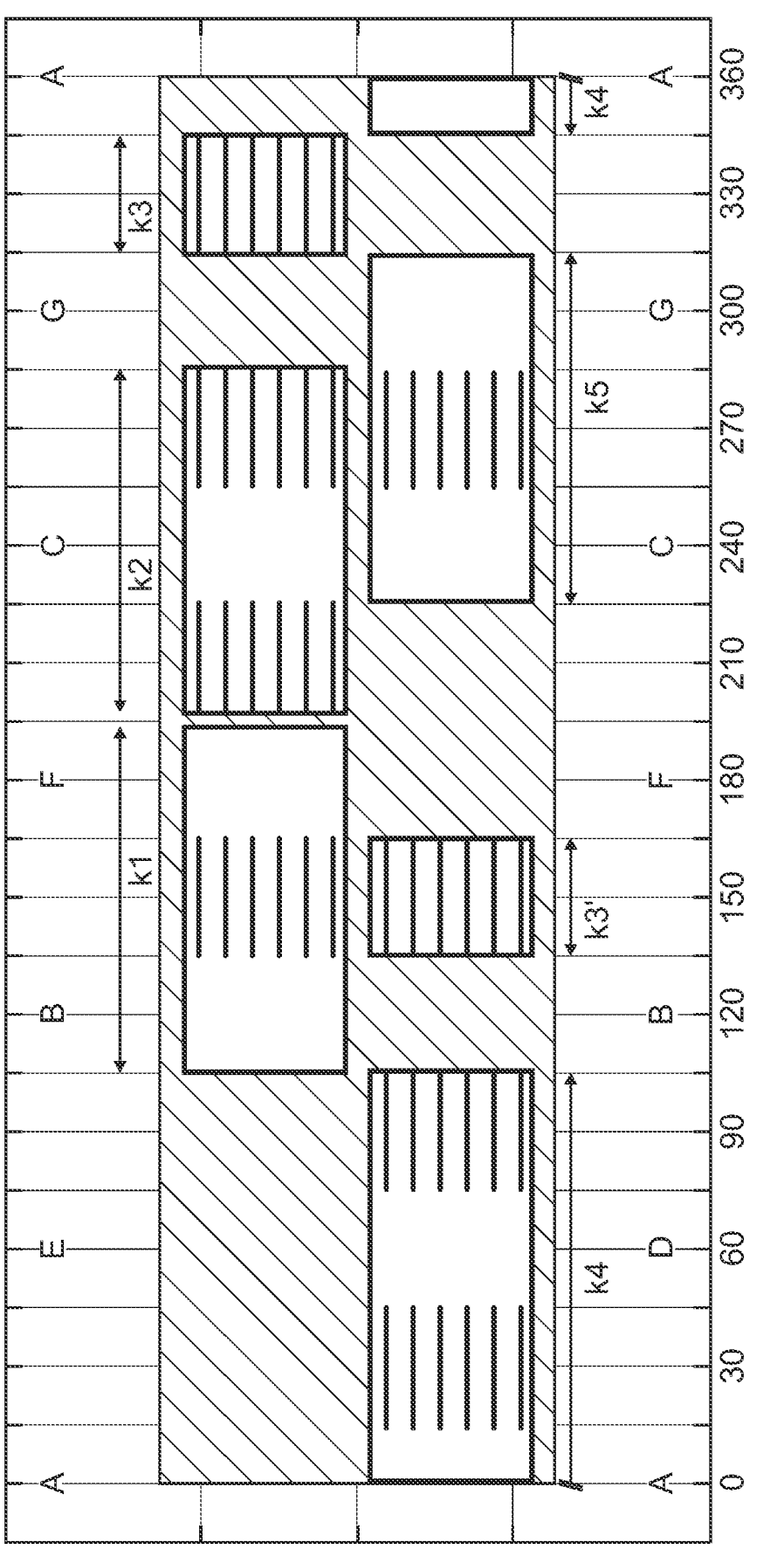
FIG. 5b shows the contact surface, corresponding to FIG. 5a, between the valve body and the housing with the seal in a development view.
Figure 5C:
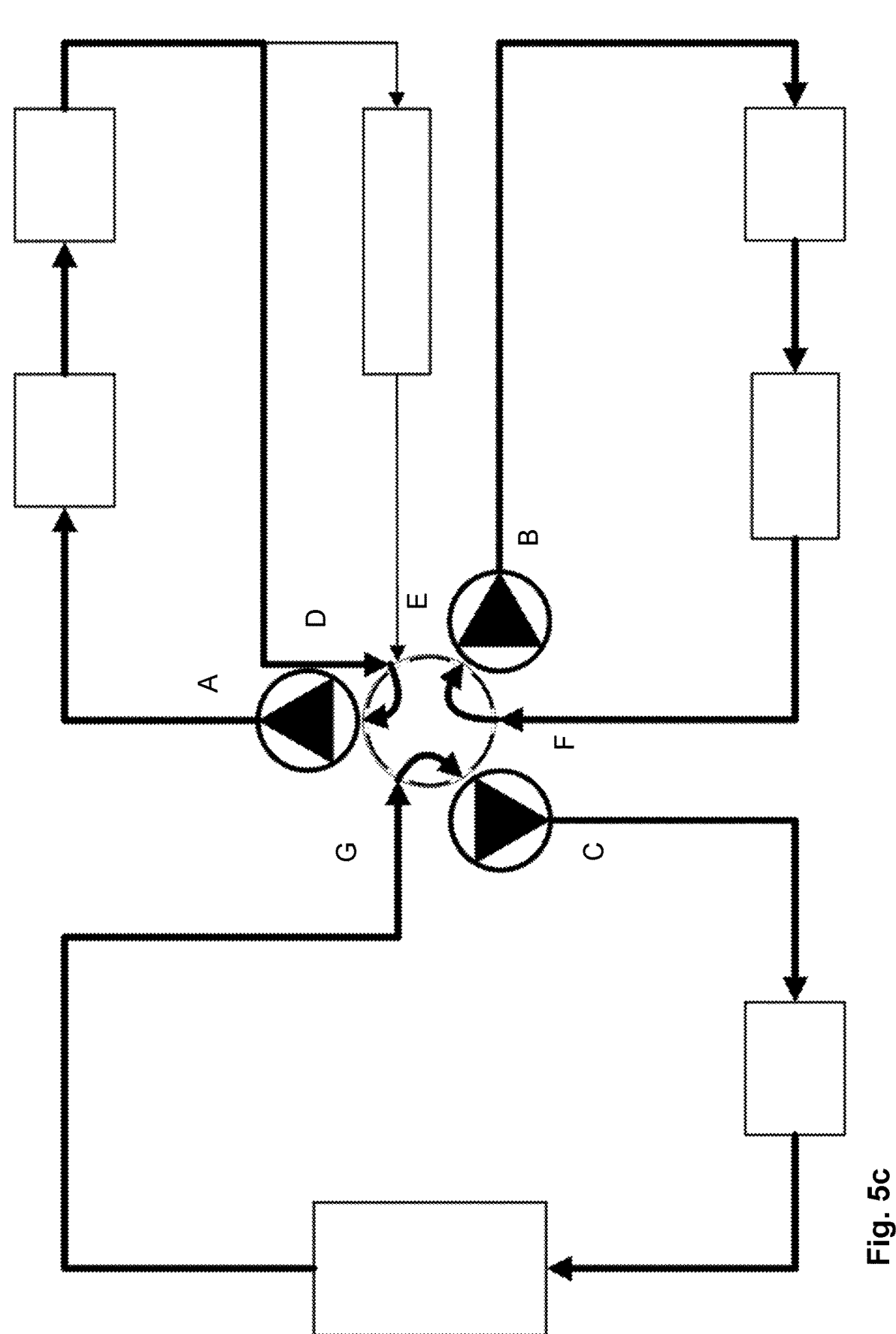
FIG. 5c shows the thermal management system in a representation, analogous to FIG. 1, in an operating state corresponding to the third rotational position of the valve body.

FIGS. 5a to 5c show a third operating state of thermal management system 2 corresponding to a third rotational position of valve body 40 of multiway valve 34. In the third operating state, the pairs corresponding to housing openings F and B, D and A, and G and C are fluidically connected to each other. Thus, each circuit 6, 18, 26 is flowed through separately, wherein drive circuit 18 is flowed through using bypass 24. Thus, there is no fluidic connection between the individual circuits 6, 18, 24.

Figure 6A:
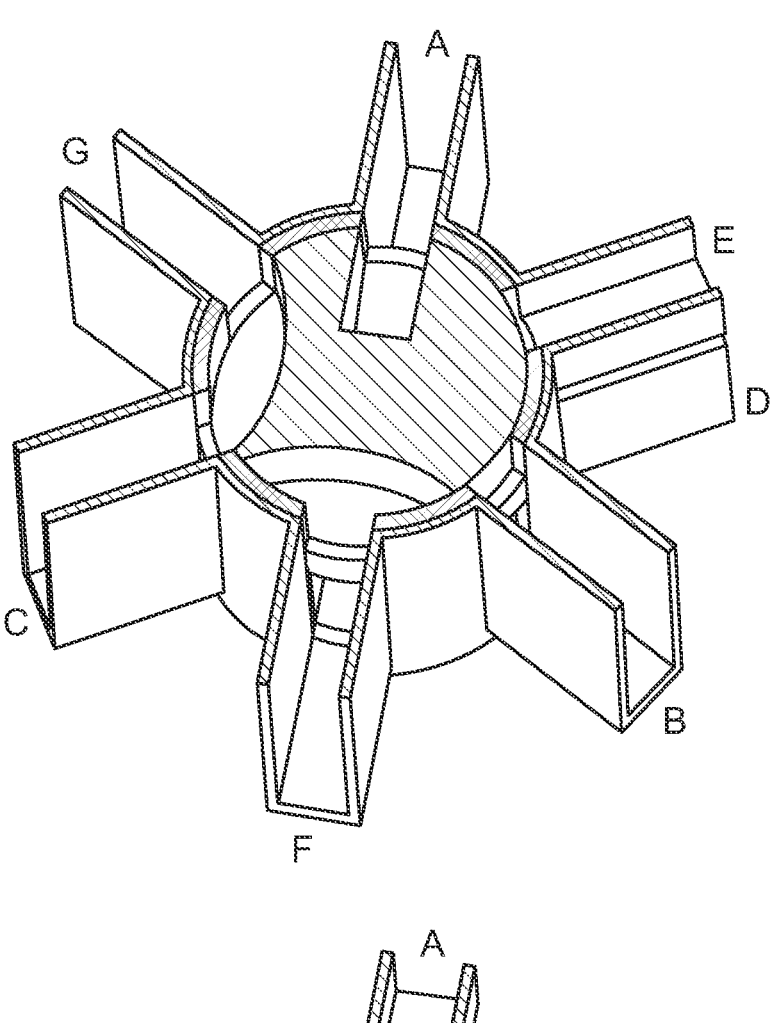
FIG. 6a shows the two planes of the multiway valve in a representation, analogous to FIGS. 2b and 2c, with the valve body in a fourth rotational position.
Figure 6A:
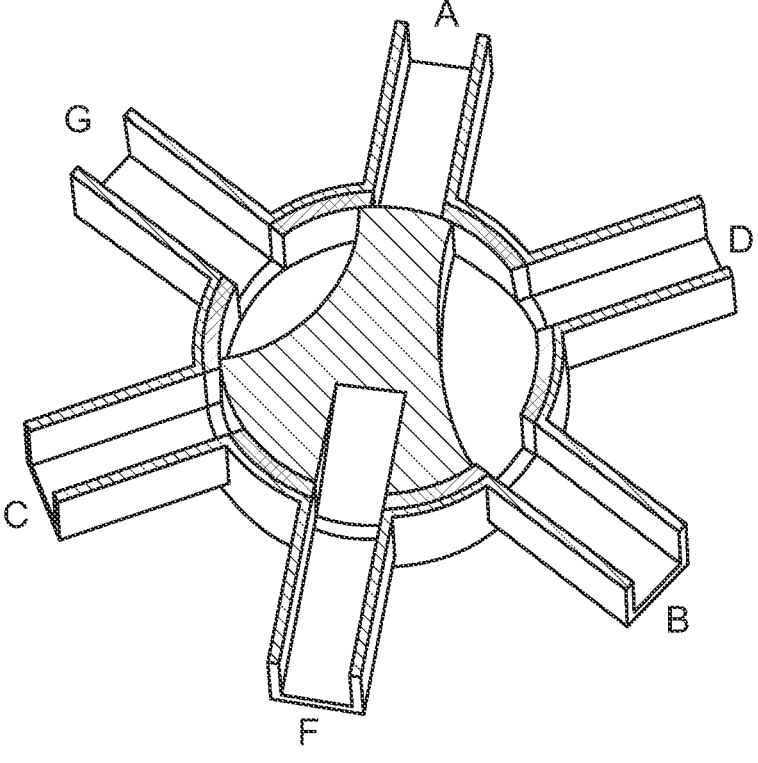
Figure 6B:
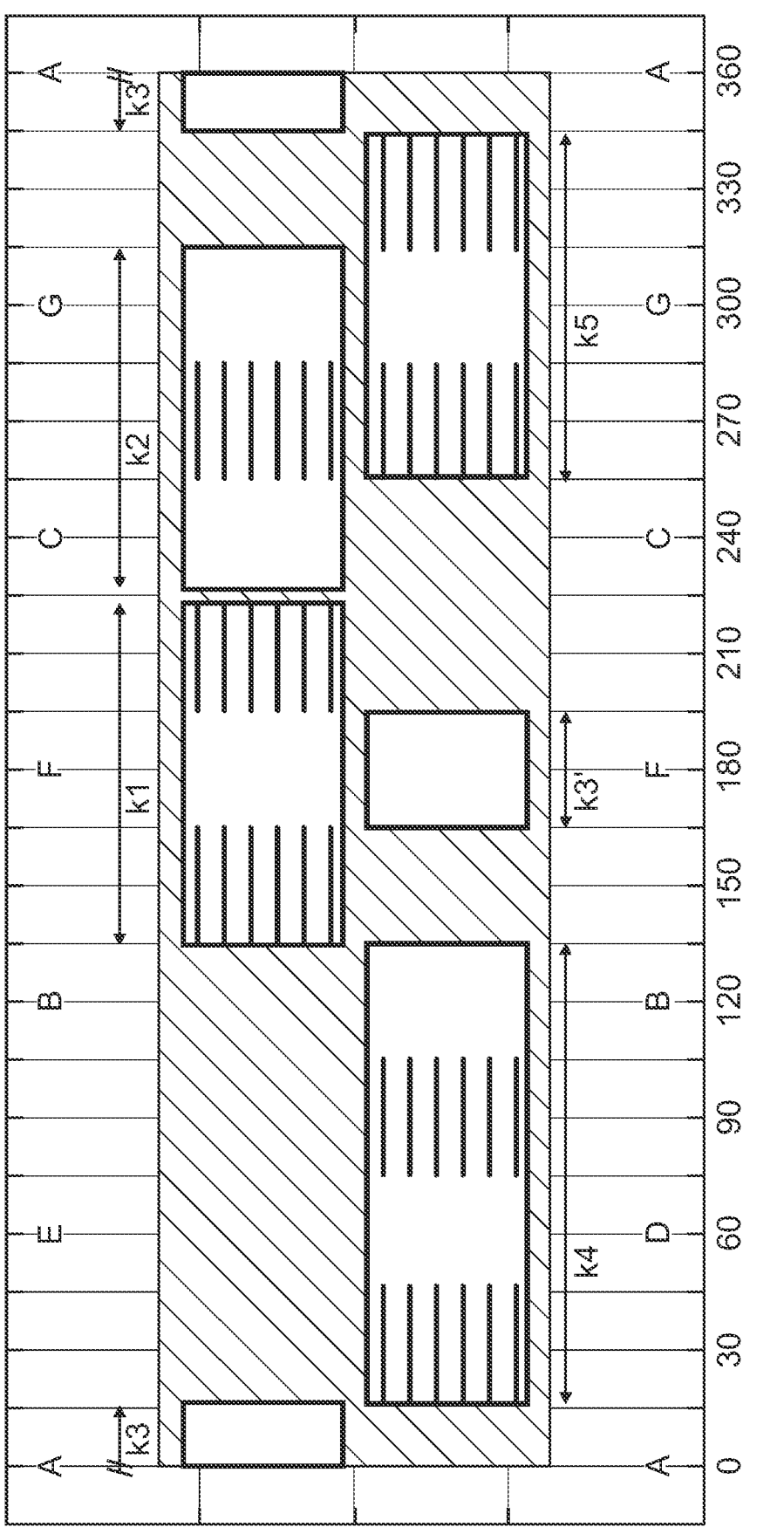
FIG. 6b shows the contact surface, corresponding to FIG. 6a, between the valve body and the housing with the seal in a development view.
Figure 6C:
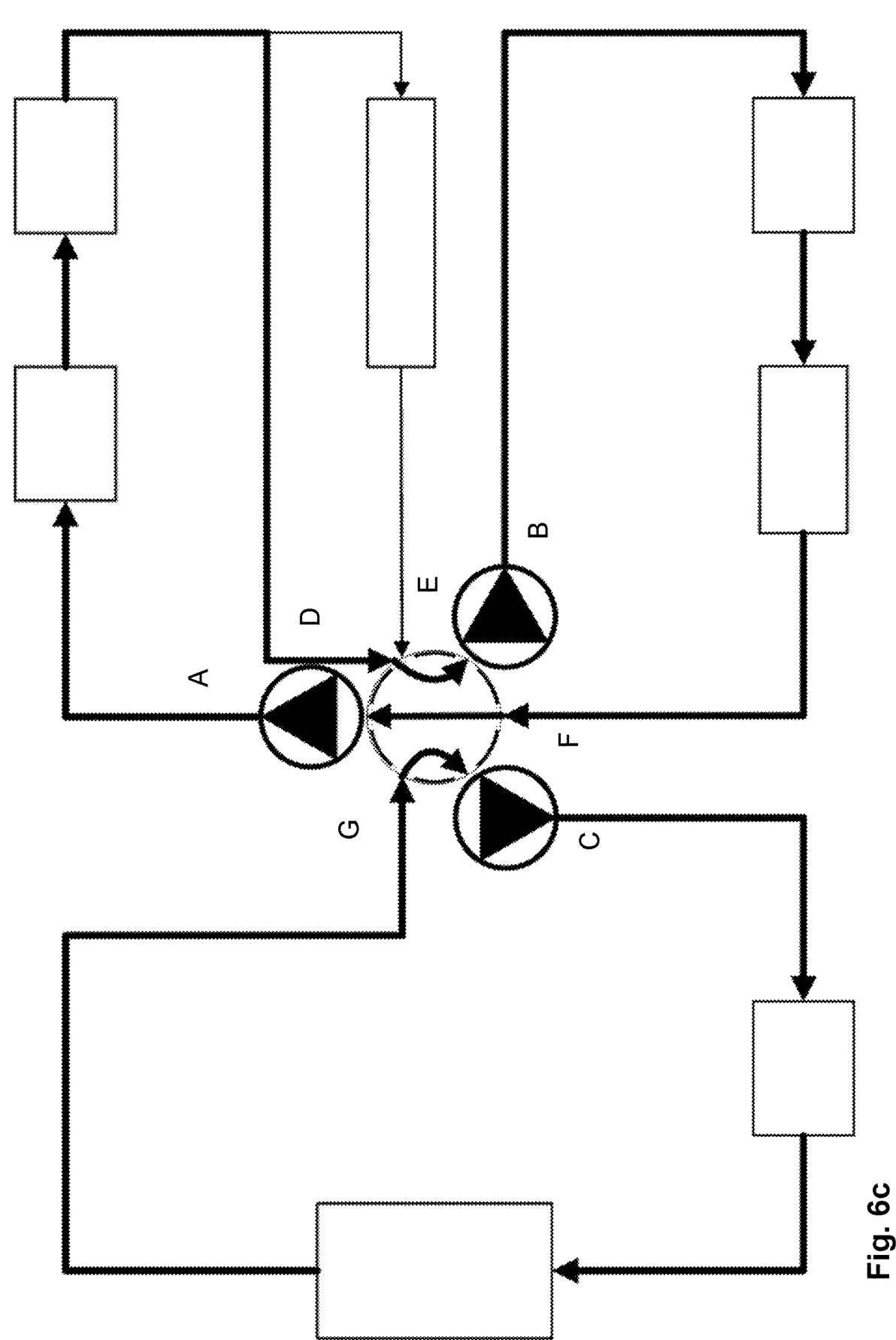
FIG. 6c shows the thermal management system in a representation, analogous to FIG. 1, in an operating state corresponding to the fourth rotational position of the valve body.

FIGS. 6a to 6c show a fourth operating state of thermal management system 2 corresponding to a fourth rotational position of valve body 40 of multiway valve 34. In the fourth operating state, the pairs corresponding to housing openings G and C, F and A, and D and B are fluidically connected to each other. This corresponds to a connection of drive circuit 18 and climate control circuit 26 to form an overall circuit, wherein drive circuit 18 is flowed through using bypass 24. Battery circuit 6 is flowed through separately therefrom.

Figure 7A:
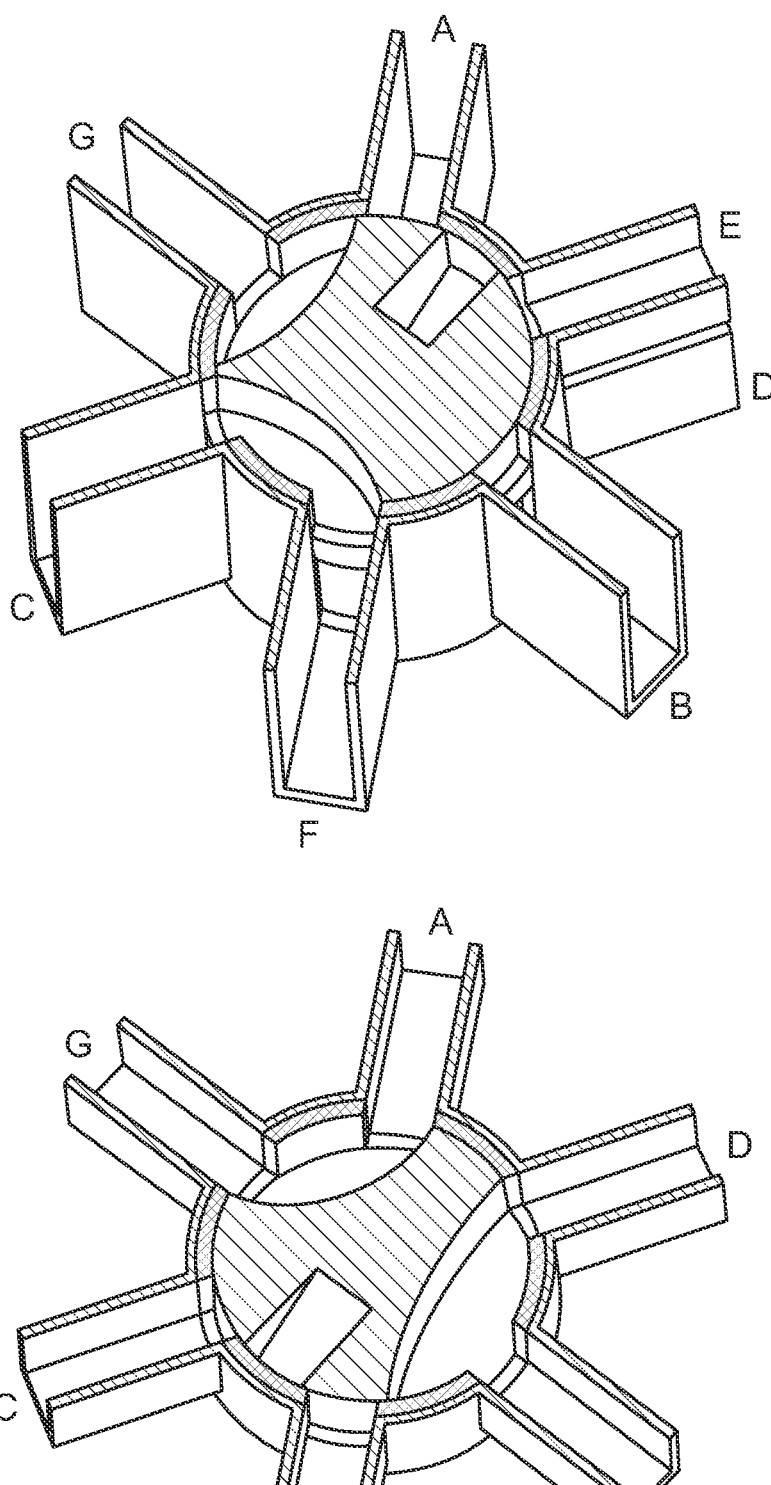
FIG. 7a shows the two planes of the multiway valve in a representation, analogous to FIGS. 2b and 2c, with the valve body in a fifth rotational position.
Figure 7B:
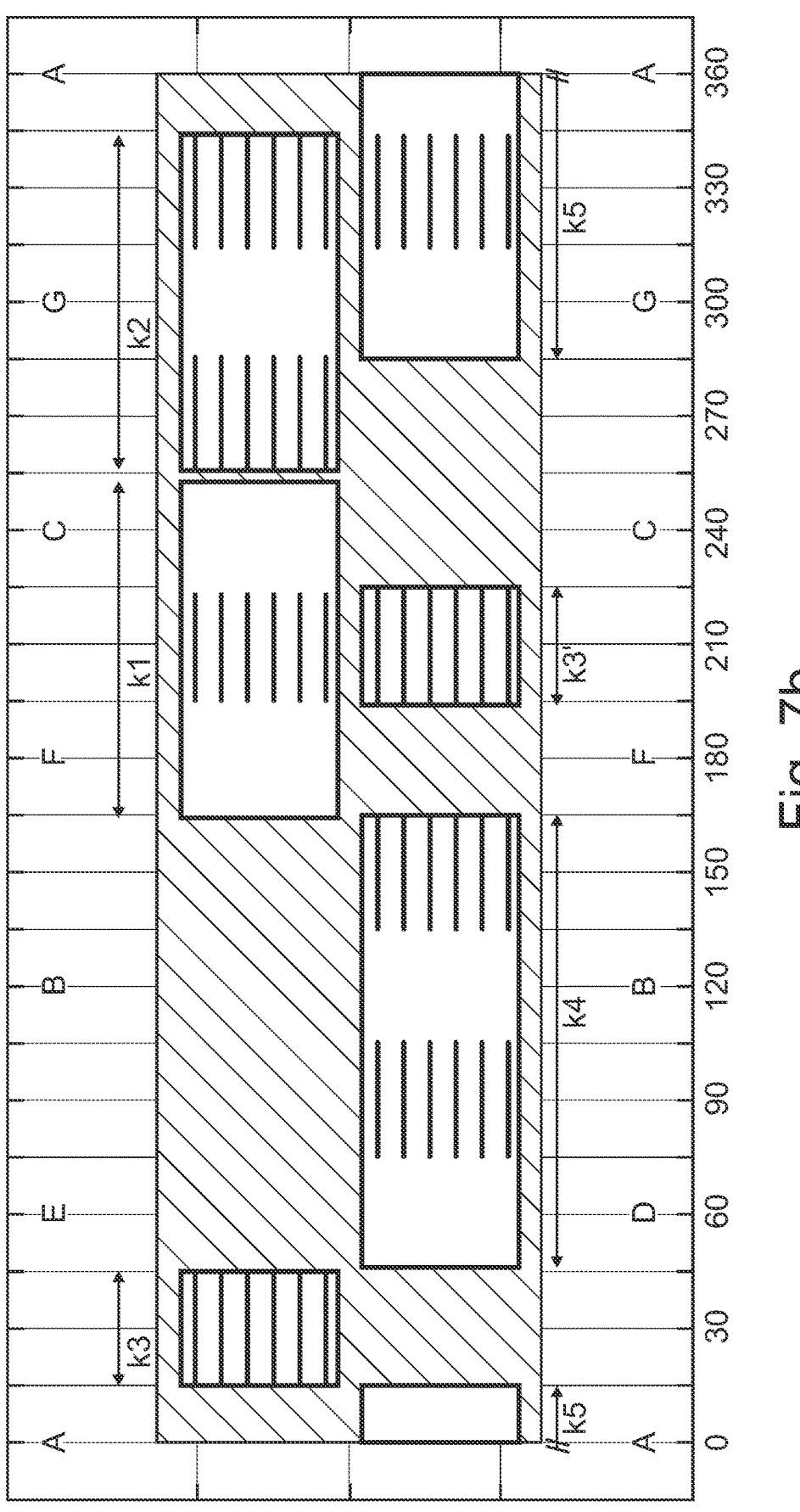
FIG. 7b shows the contact surface, corresponding to FIG. 7a, between the valve body and the housing with the seal in a development view.
Figure 7C:
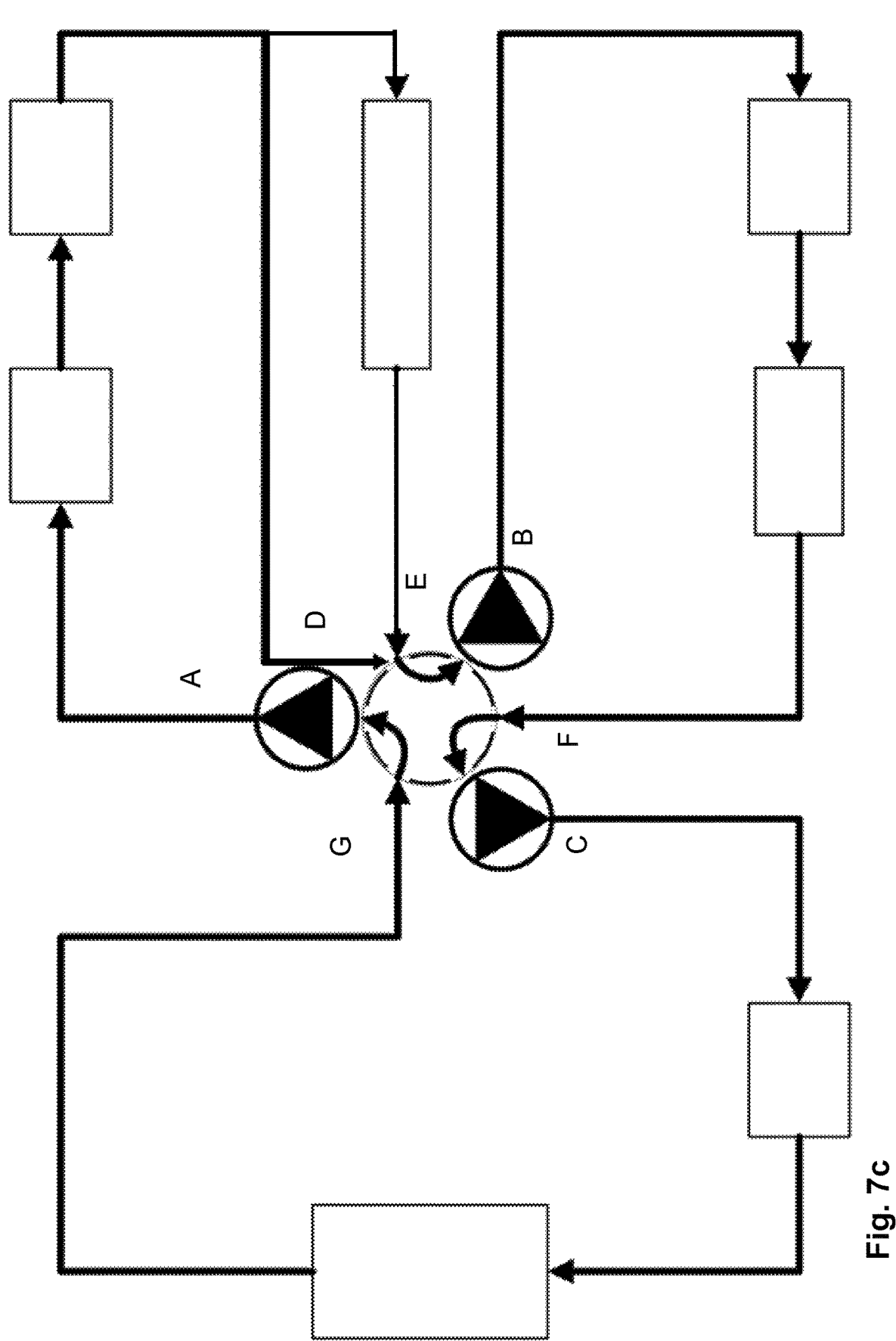
FIG. 7c shows the thermal management system in a representation, analogous to FIG. 1, in an operating state corresponding to the fifth rotational position of the valve body.

FIGS. 7a to 7c show a fifth operating state of thermal management system 2 corresponding to a fifth rotational position of valve body 40 of multiway valve 34. In the fifth operating state, the pairs corresponding to housing openings F and C, D and B, and G and A are fluidically connected to each other. This corresponds to a connection of all three circuits 6, 18, 24 to form a single overall circuit, wherein the coolant from drive circuit 18 flows into the multiway valve 34 through bypass 24.

Figure 8A:
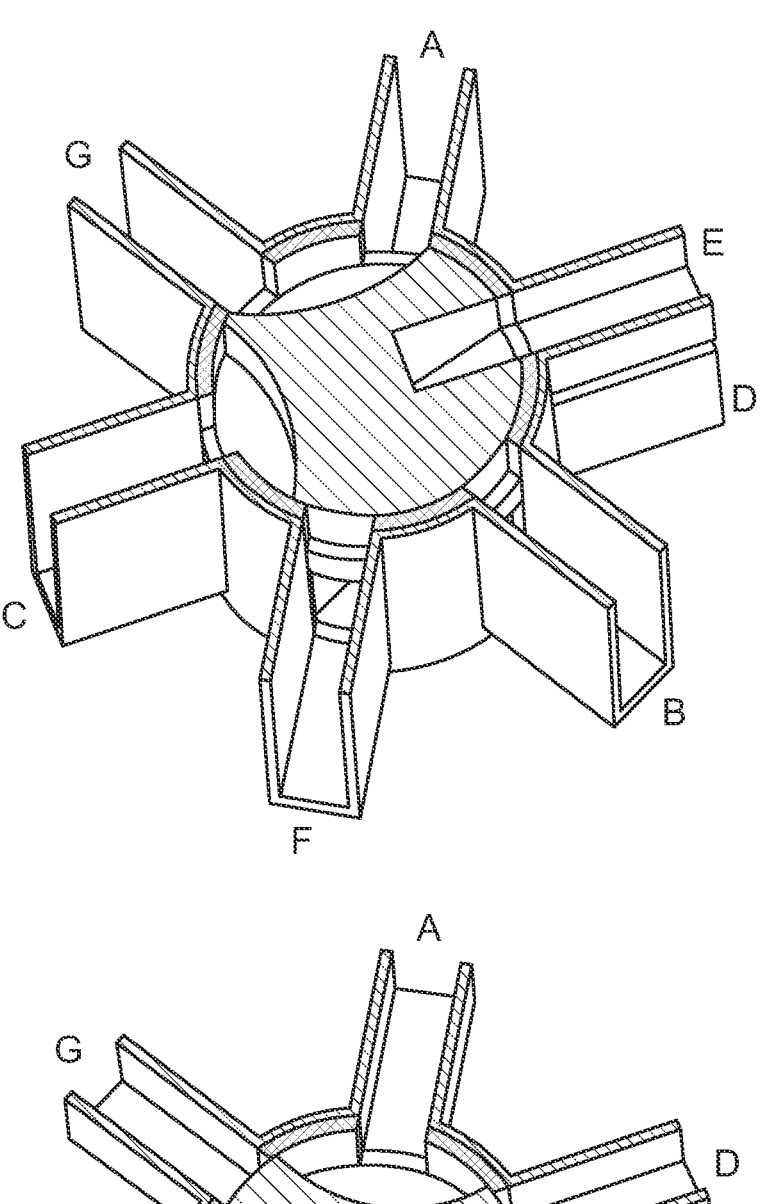
FIG. 8a shows the two planes of the multiway valve in a representation, analogous to FIGS. 2b and 2c, with the valve body in a sixth rotational position.
Figure 8B:
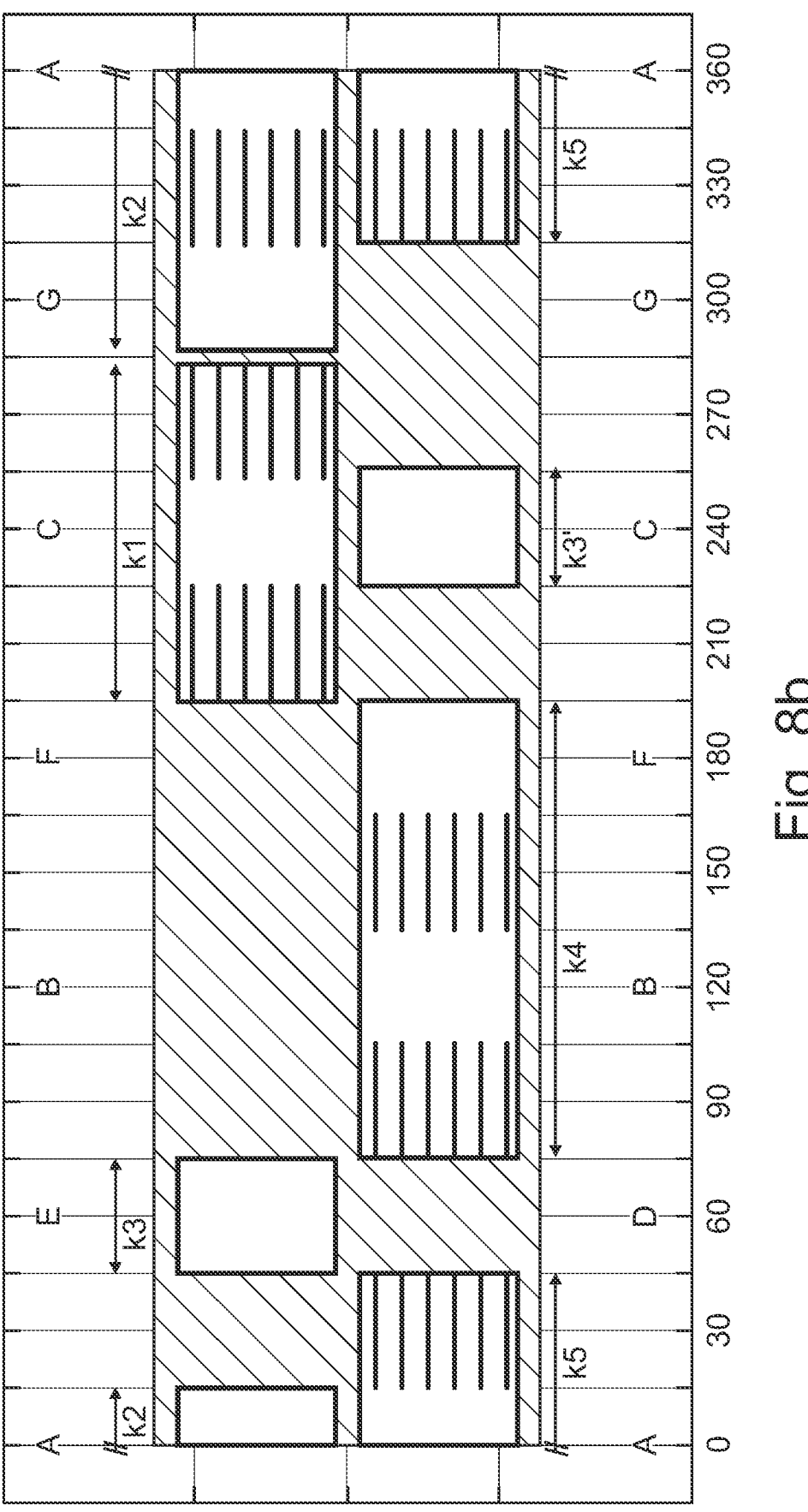
FIG. 8b shows the contact surface, corresponding to FIG. 8a, between the valve body and the housing with the seal in a development view.
Figure 8C:
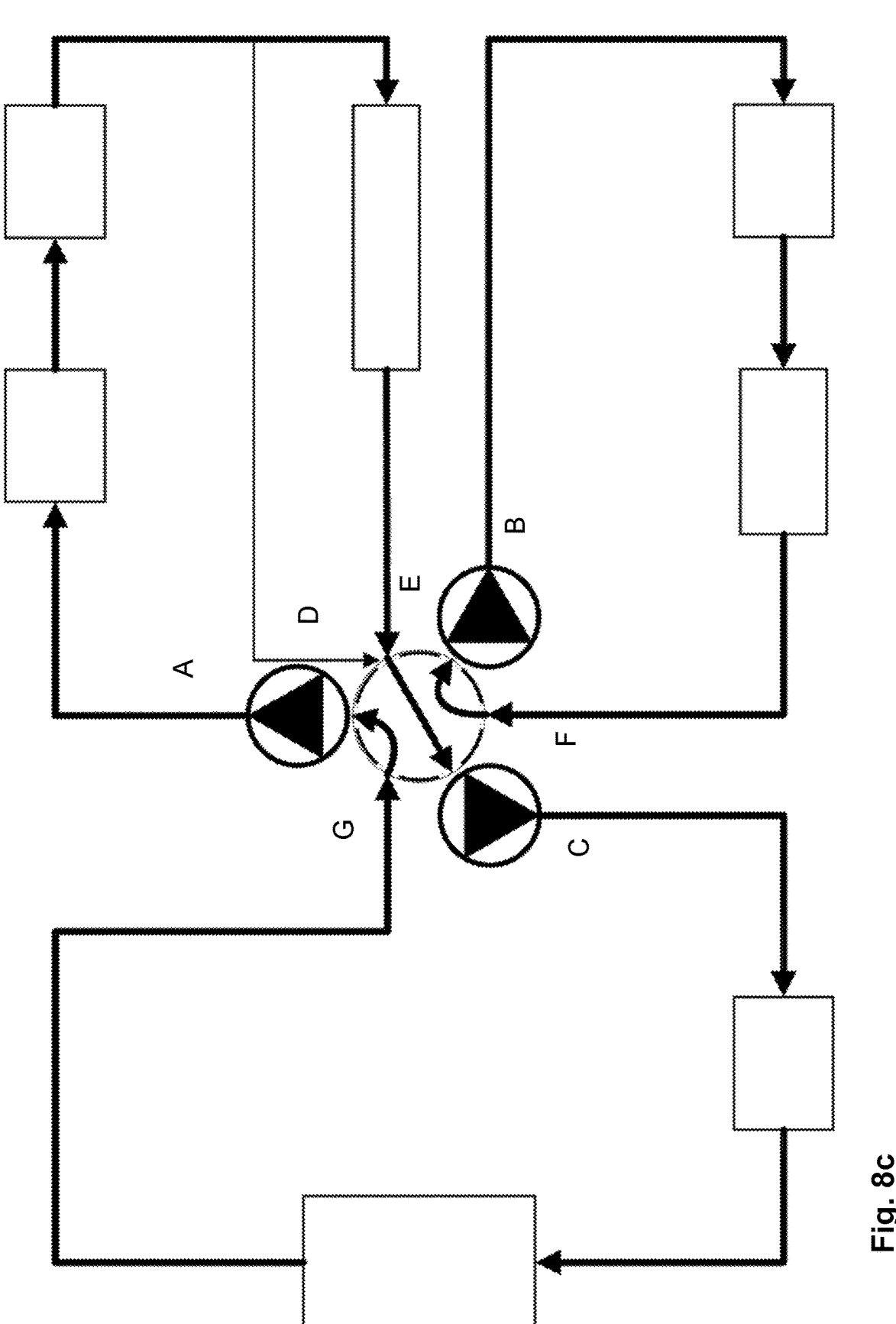
FIG. 8c shows the thermal management system in a representation, analogous to FIG. 1, in an operating state corresponding to the sixth rotational position of the valve body.

FIGS. 8a to 8c show a sixth operating state of thermal management system 2 corresponding to a sixth rotational position of valve body 40 of multiway valve 34. In the sixth operating state, the pairs corresponding to housing openings G and A, E and C, and F and B are fluidically connected to each other. This corresponds to a connection of drive circuit 18 and battery circuit 6 to form an overall circuit, wherein drive circuit 18 is flowed through using radiator 22. Climate control circuit 26 is flowed through separately therefrom.

Figure 9A:
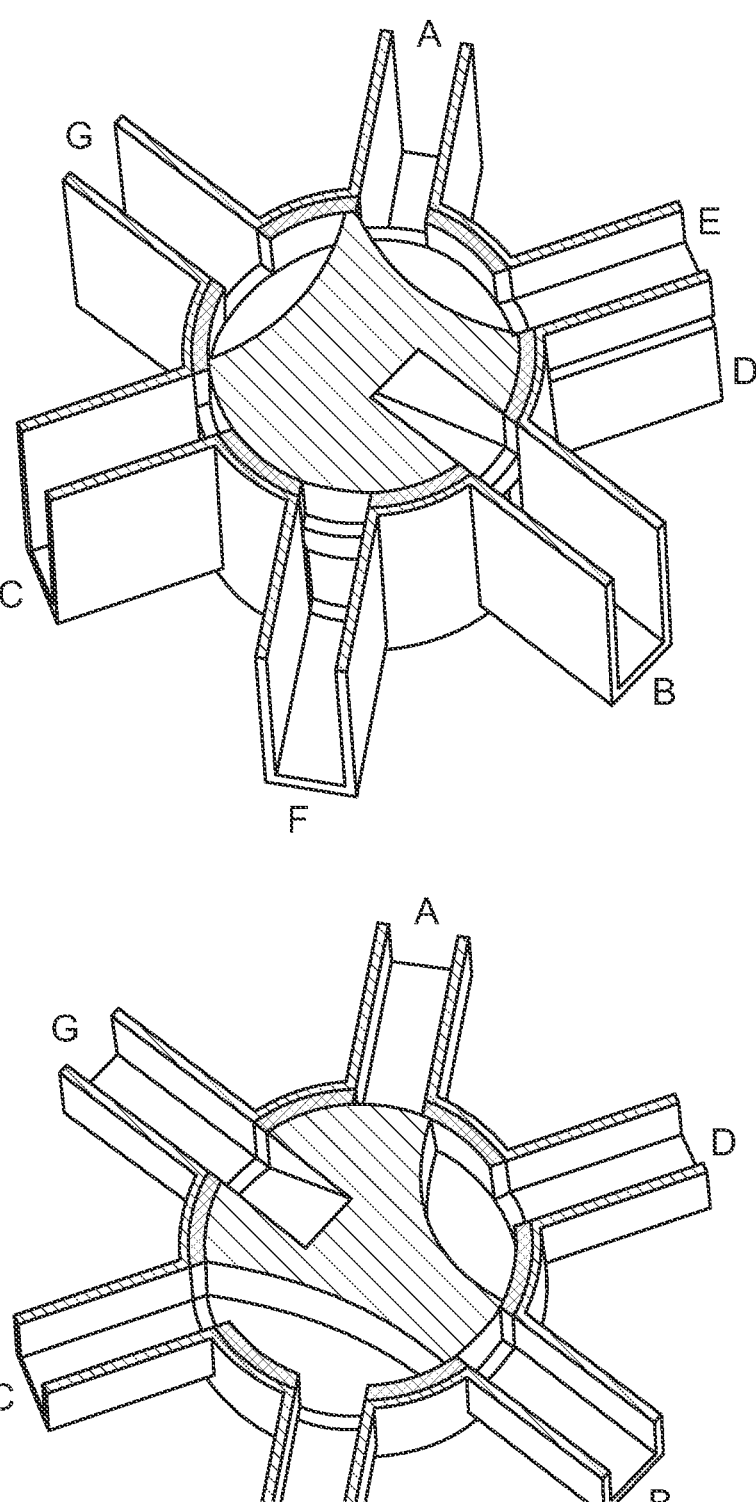
FIG. 9a shows the two planes of the multiway valve in a representation, analogous to FIGS. 2b and 2c, with the valve body in a seventh rotational position.
Figure 9B:
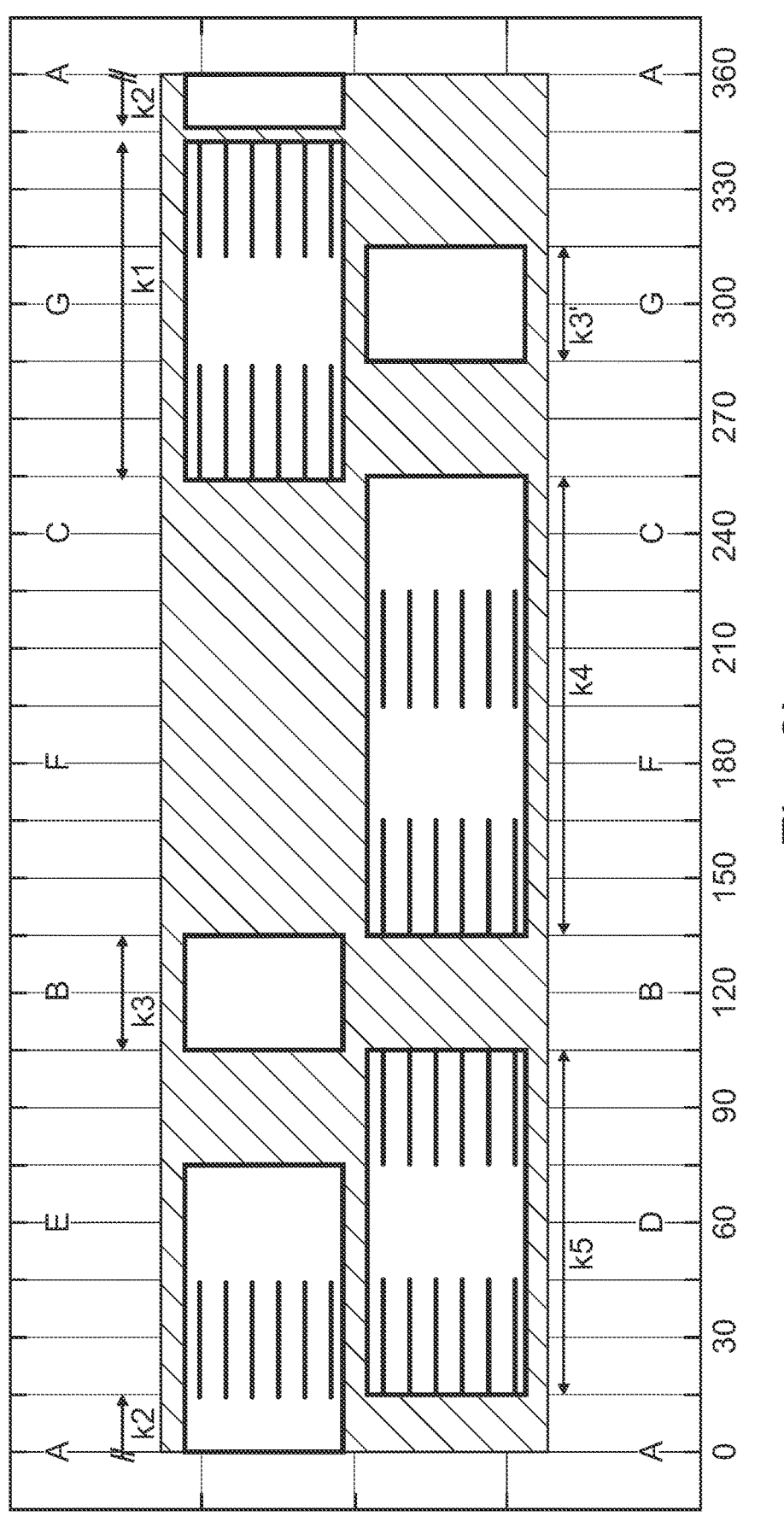
FIG. 9b shows the contact surface, corresponding to FIG. 9a, between the valve body and the housing with the seal in a development view.
Figure 9C:
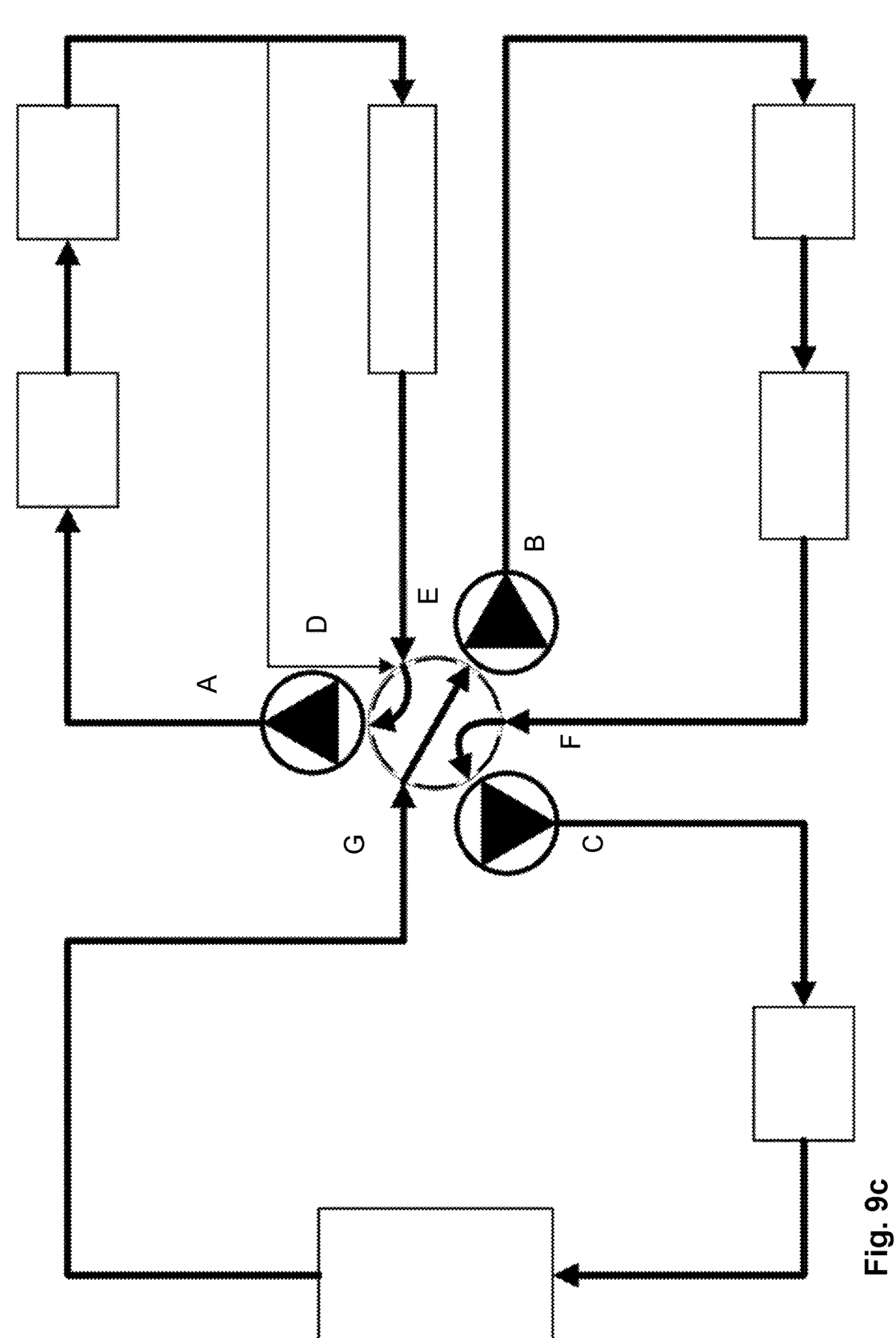
FIG. 9c shows the thermal management system in a representation, analogous to FIG. 1, in an operating state corresponding to the seventh rotational position of the valve body.

FIGS. 9a to 9c show a seventh operating state of thermal management system 2 corresponding to a seventh rotational position of valve body 40 of multiway valve 34. In the seventh operating state, the pairs corresponding to housing openings E and A, G and B, and F and C are fluidically connected to each other. This corresponds to a connection of battery circuit 6 and climate control circuit 26 to form an overall circuit, whereas drive circuit 18 is flowed through separately therefrom using radiator 22.

Figure 10A:
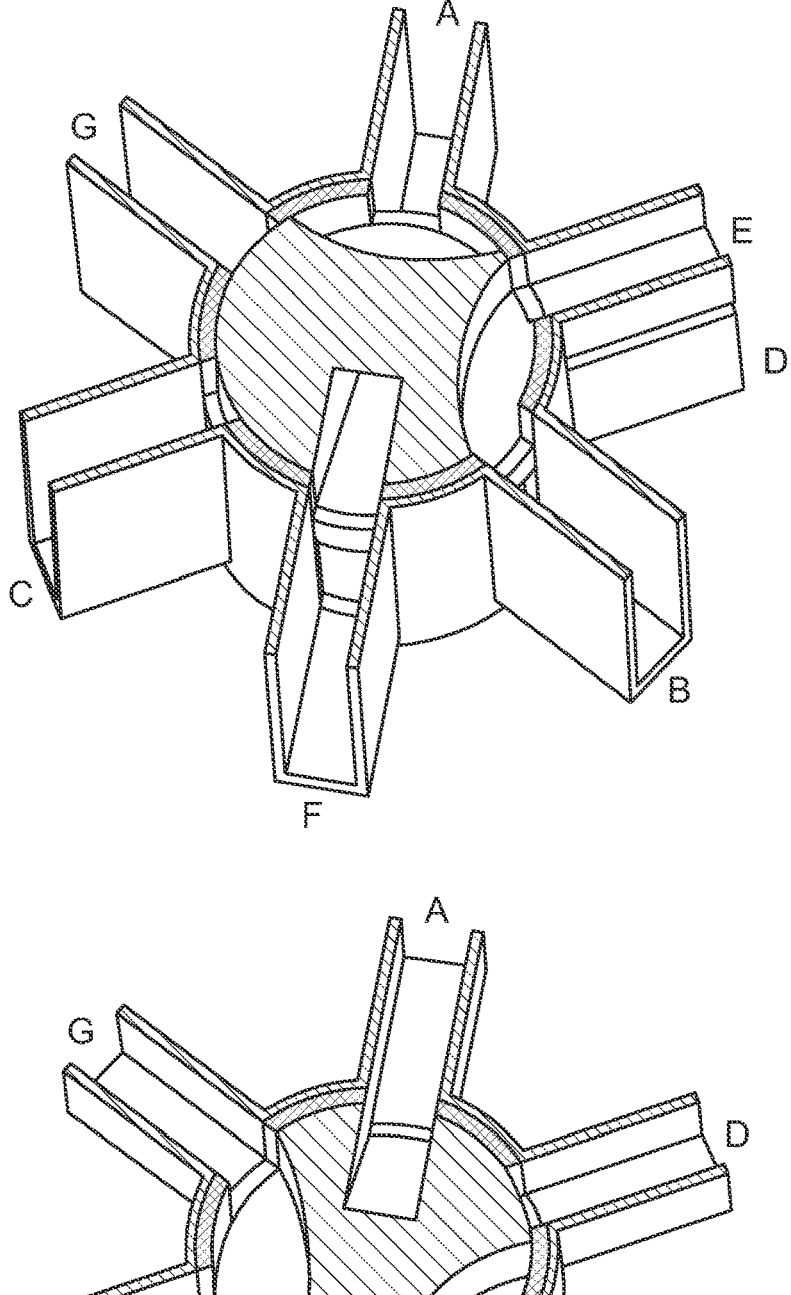
FIG. 10a shows the two planes of the multiway valve in a representation, analogous to FIGS. 2b and 2c, with the valve body in an eighth rotational position.
Figure 10B:
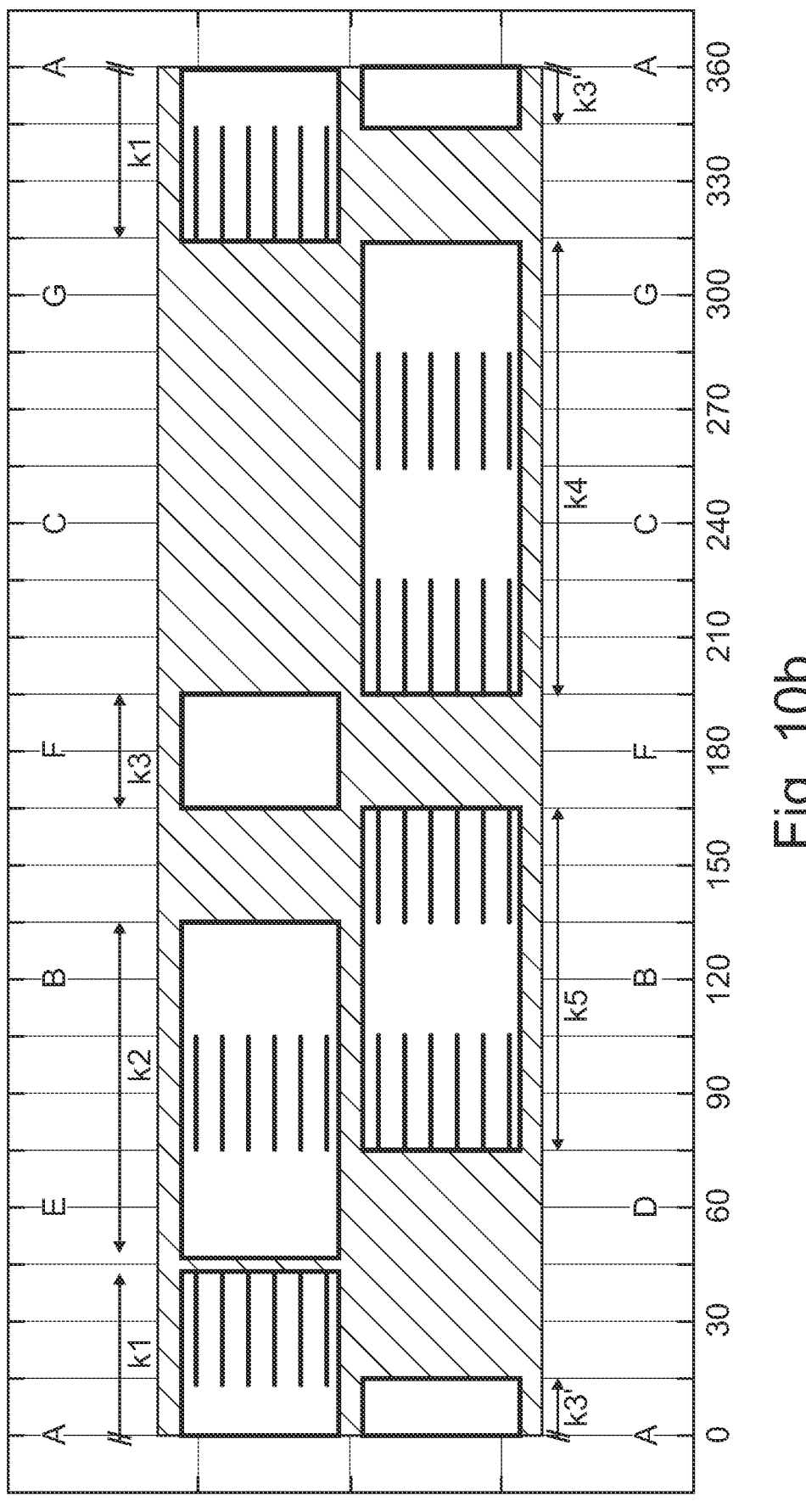
FIG. 10b shows the contact surface, corresponding to FIG. 10a, between the valve body and the housing with the seal in a development view.
Figure 10C:
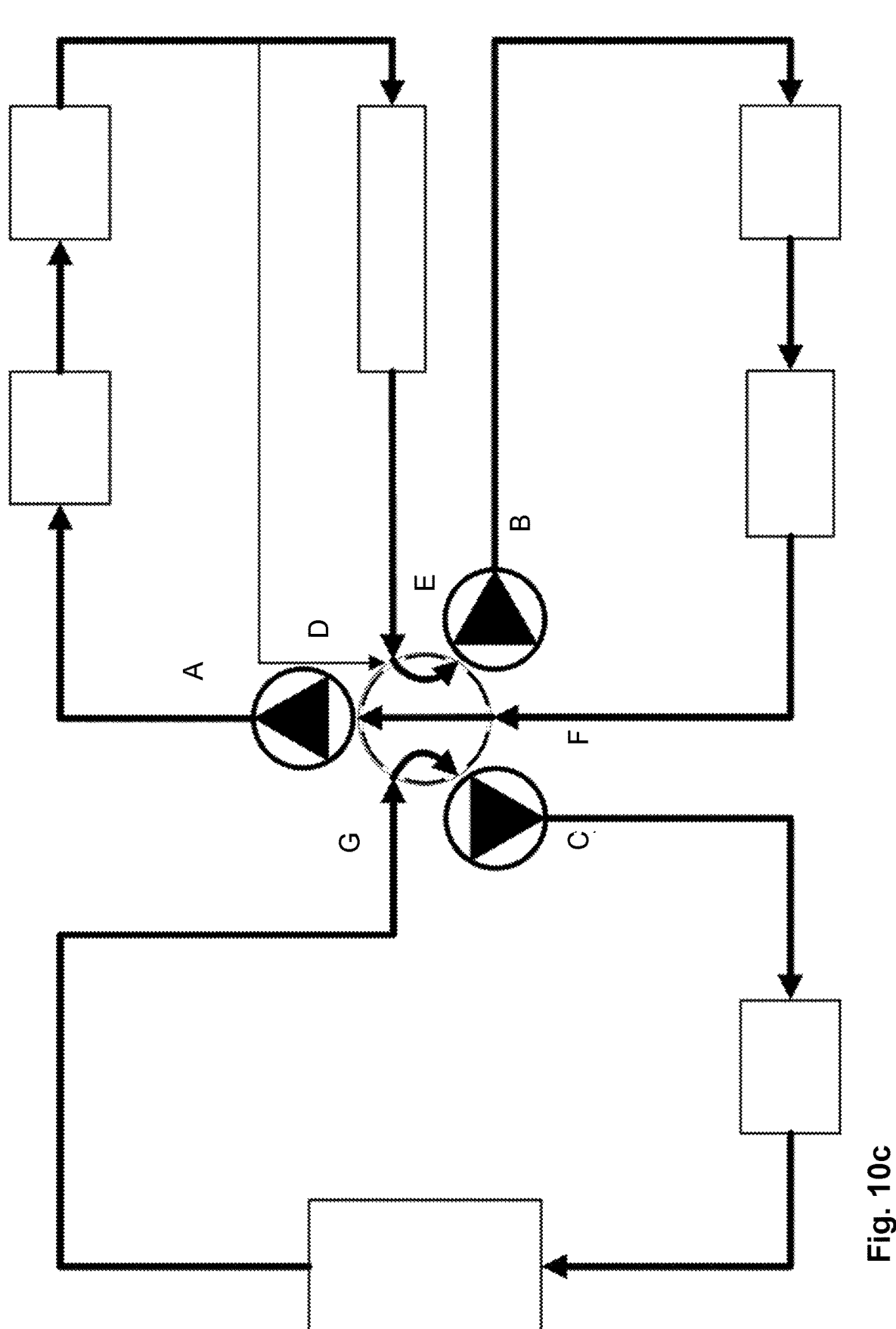
FIG. 10c shows the thermal management system in a representation, analogous to FIG. 1, in an operating state corresponding to the eighth rotational position of the valve body.

FIGS. 10a to 10c show an eighth operating state of thermal management system 2 corresponding to an eighth rotational position of valve body 40 of multiway valve 34. In the eighth operating state, the pairs corresponding to housing openings E and B, F and A, and G and C are fluidically connected to each other. This corresponds to a connection of drive circuit 18 and climate control circuit 26 to form an overall circuit, wherein drive circuit 18 is flowed through using radiator 22. Battery circuit 6 is flowed through separately therefrom.

Figure 11A:
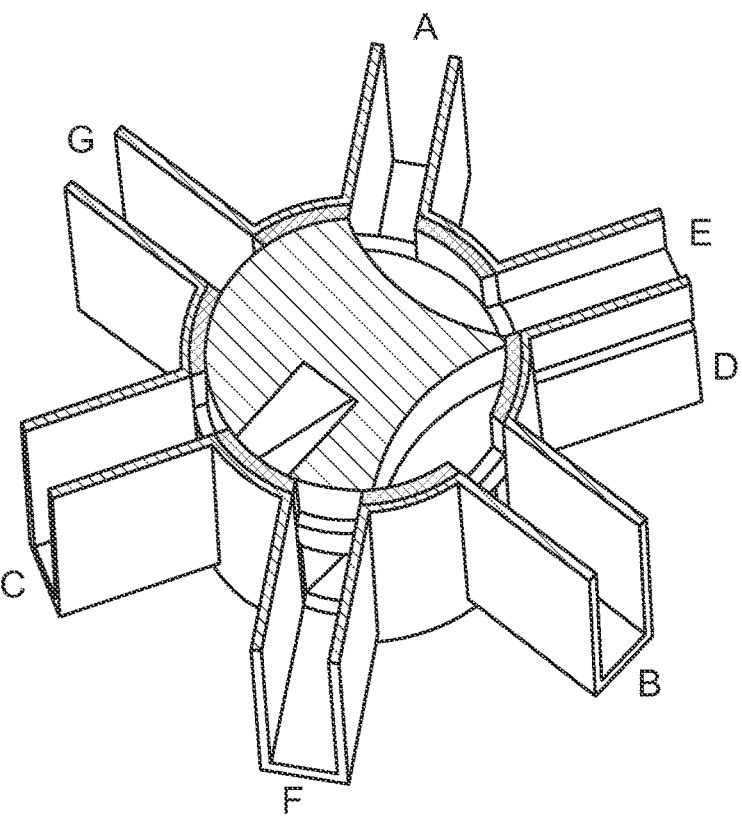
FIG. 11a shows the two planes of the multiway valve in a representation, analogous to FIGS. 2b and 2c, with the valve body in a ninth rotational position.
Figure 11A:
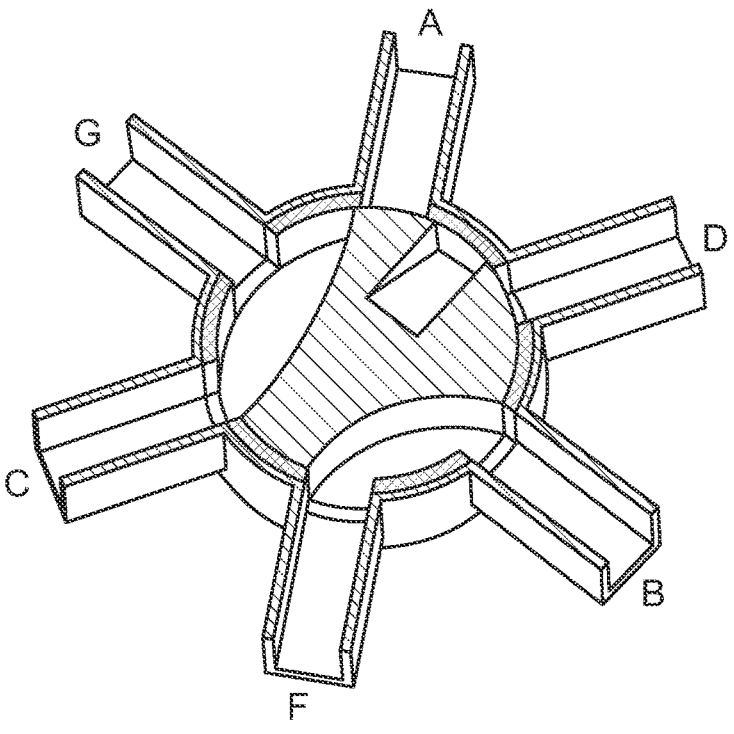
Figure 11B:
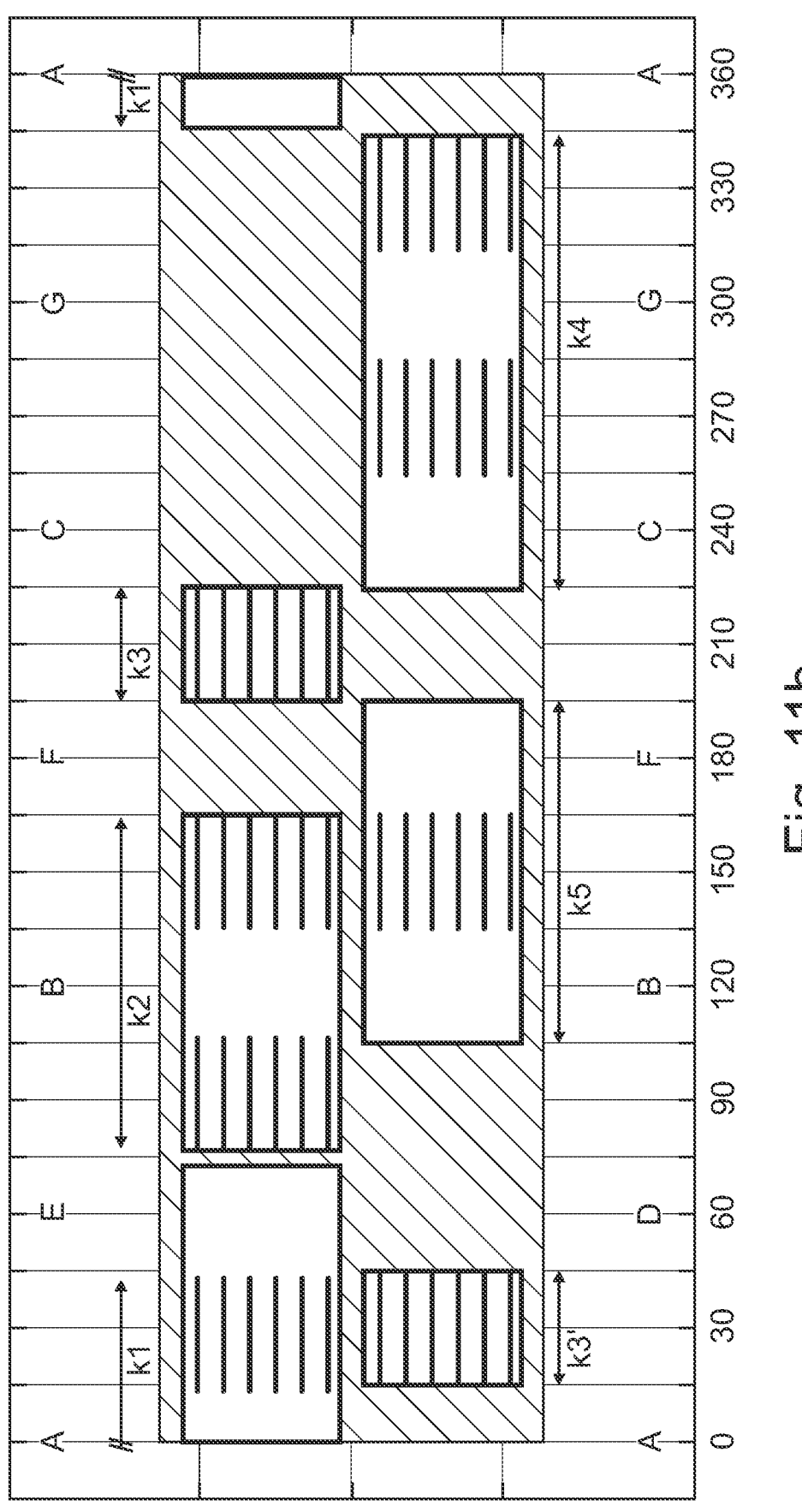
FIG. 11b shows the contact surface, corresponding to FIG. 11a, between the valve body and the housing with the seal in a development view.
Figure 11C:
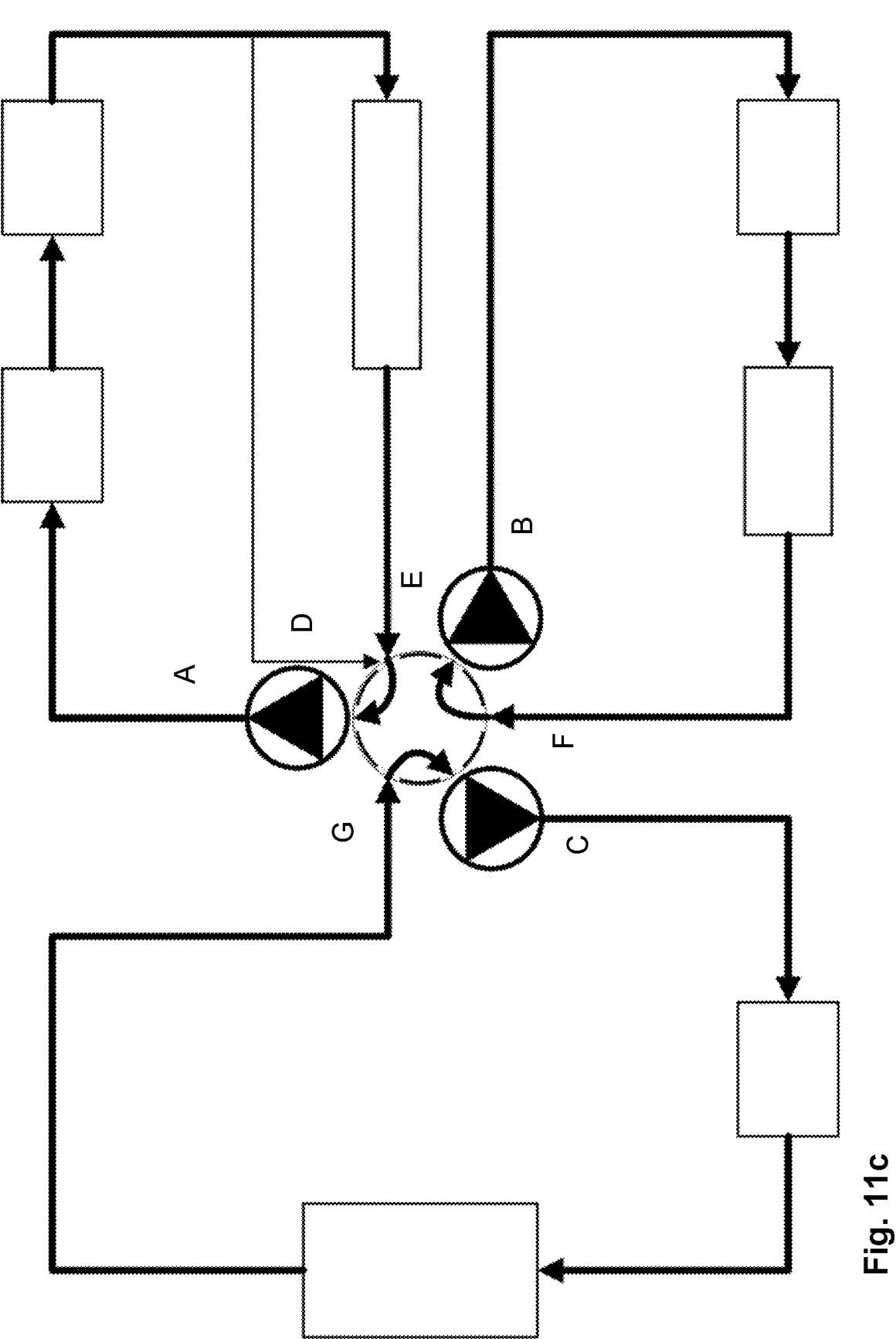
FIG. 11c shows the thermal management system in a representation, analogous to FIG. 1, in an operating state corresponding to the ninth rotational position of the valve body.

FIGS. 11a to 11c show a ninth operating state of thermal management system 2 corresponding to a ninth rotational position of valve body 40 of multiway valve 34. In the ninth operating state, the pairs corresponding to housing openings E and A, F and B, and G and C are fluidically connected to each other. Thus, each circuit 6, 18, 26 is flowed through separately, wherein drive circuit 18 is flowed through using radiator 22. Thus, there are no fluidic connections between circuits 6, 18, 26.

Figure 12A:
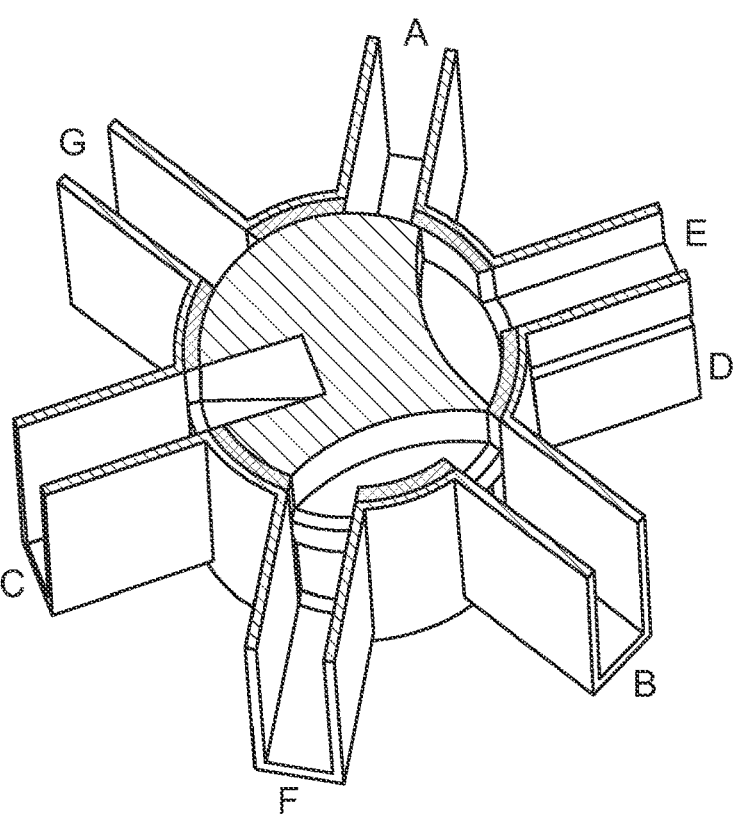
FIG. 12a shows the two planes of the multiway valve in a representation, analogous to FIGS. 2b and 2c, with the valve body in a tenth rotational position.
Figure 12A:
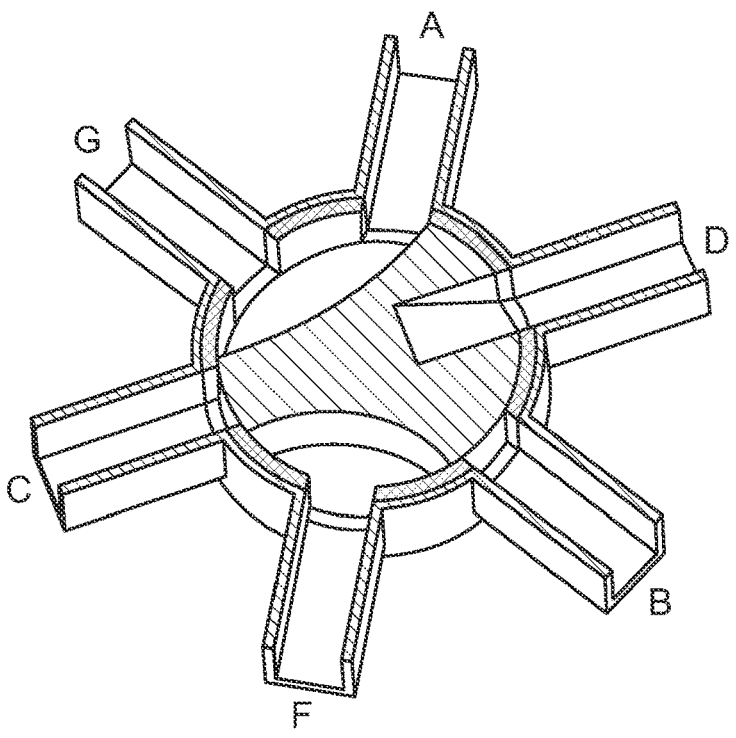
Figure 12B:
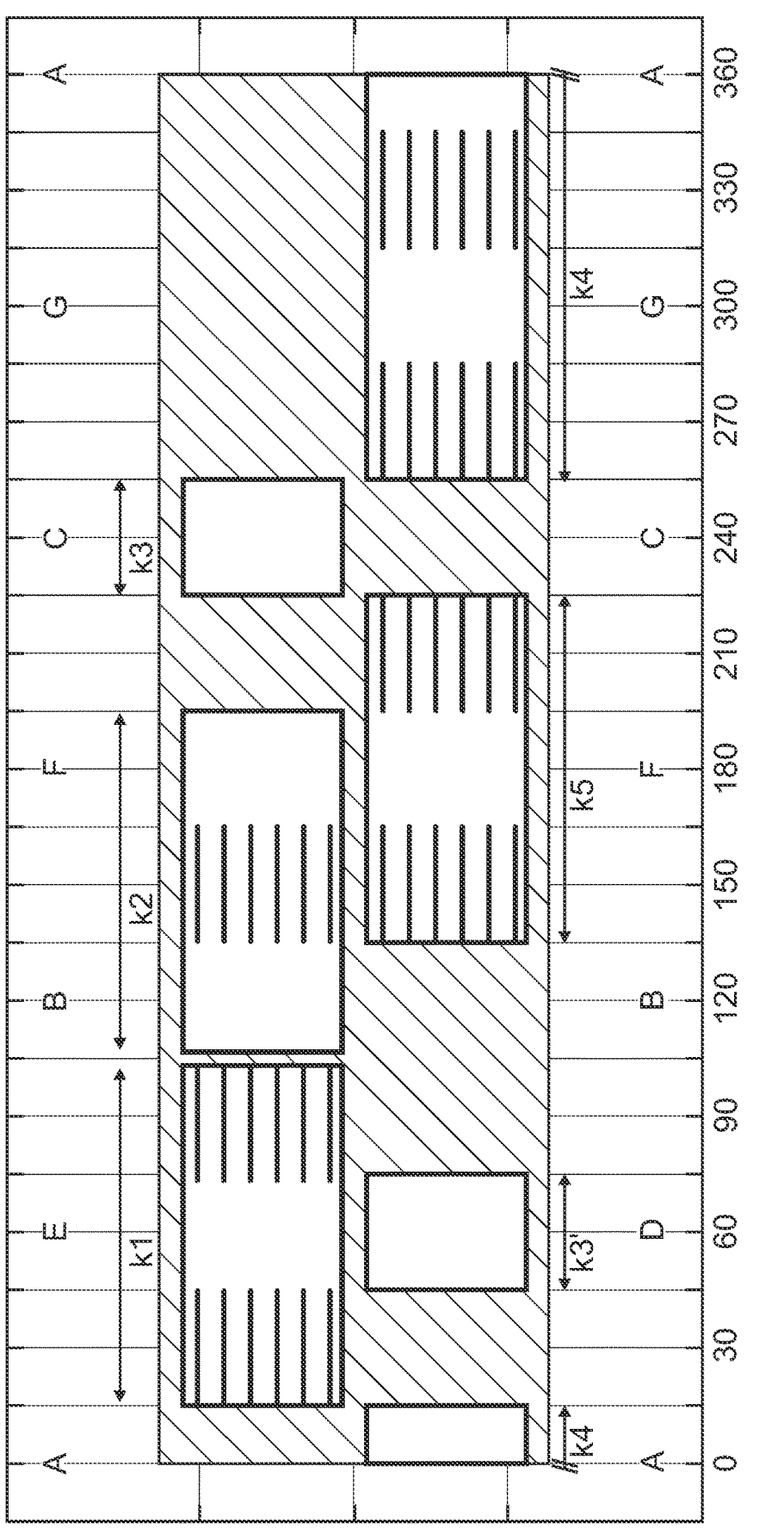
FIG. 12b shows the contact surface, corresponding to FIG. 12a, between the valve body and the housing with the seal in a development view.
Figure 12C:
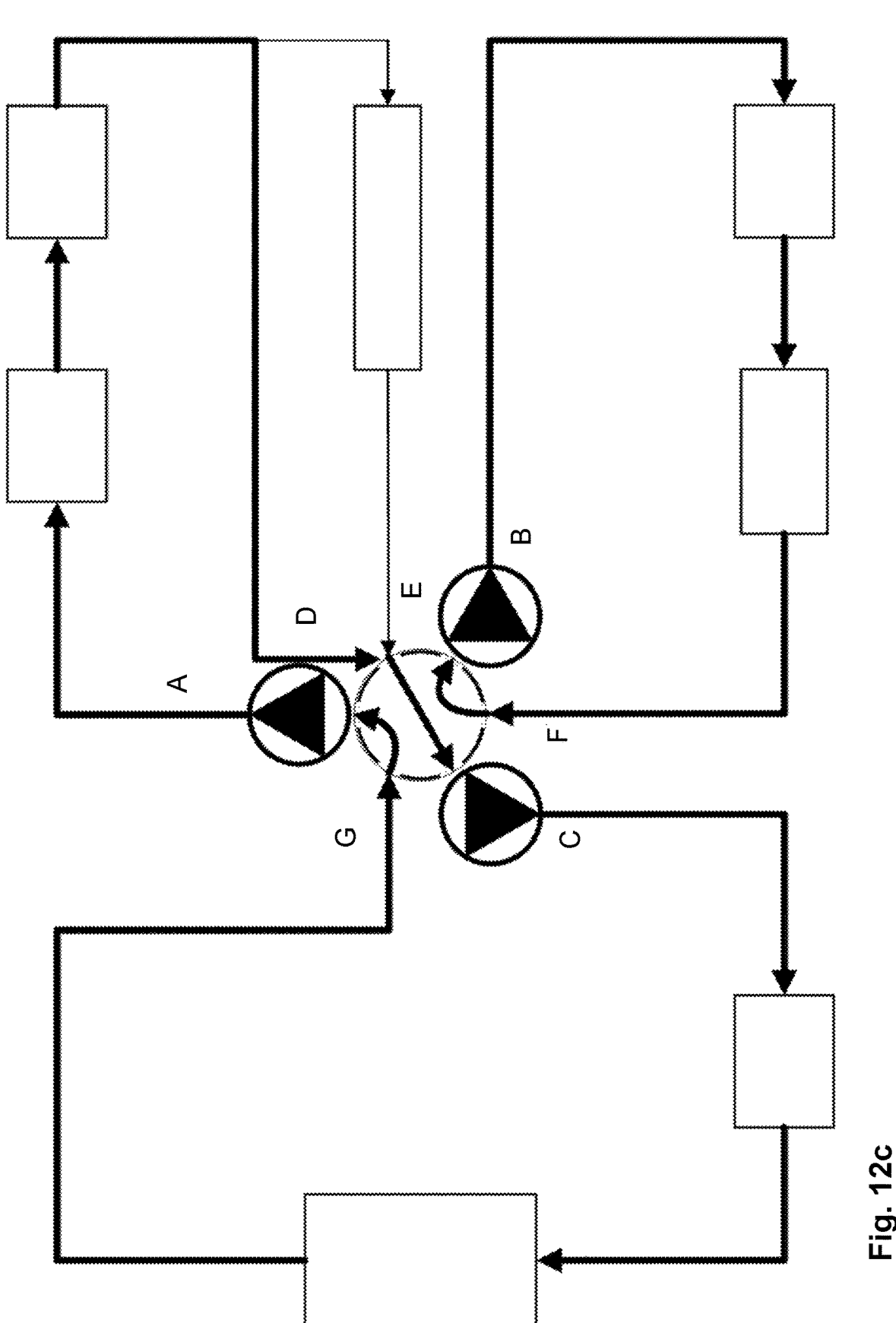
FIG. 12c shows the thermal management system in a representation, analogous to FIG. 1, in an operating state corresponding to the tenth rotational position of the valve body.

FIGS. 12a to 12c show a tenth operating state of thermal management system 2 corresponding to a tenth rotational position of valve body 40 of multiway valve 34. In the tenth operating state, the pairs corresponding to housing openings F and B, D and C, and G and A are fluidically connected to each other. This corresponds to a connection of drive circuit 18 and battery circuit 6 to form an overall circuit, wherein drive circuit 18 is flowed through using bypass 24. Climate control circuit 26 is flowed through separately therefrom.

Figure 13A:
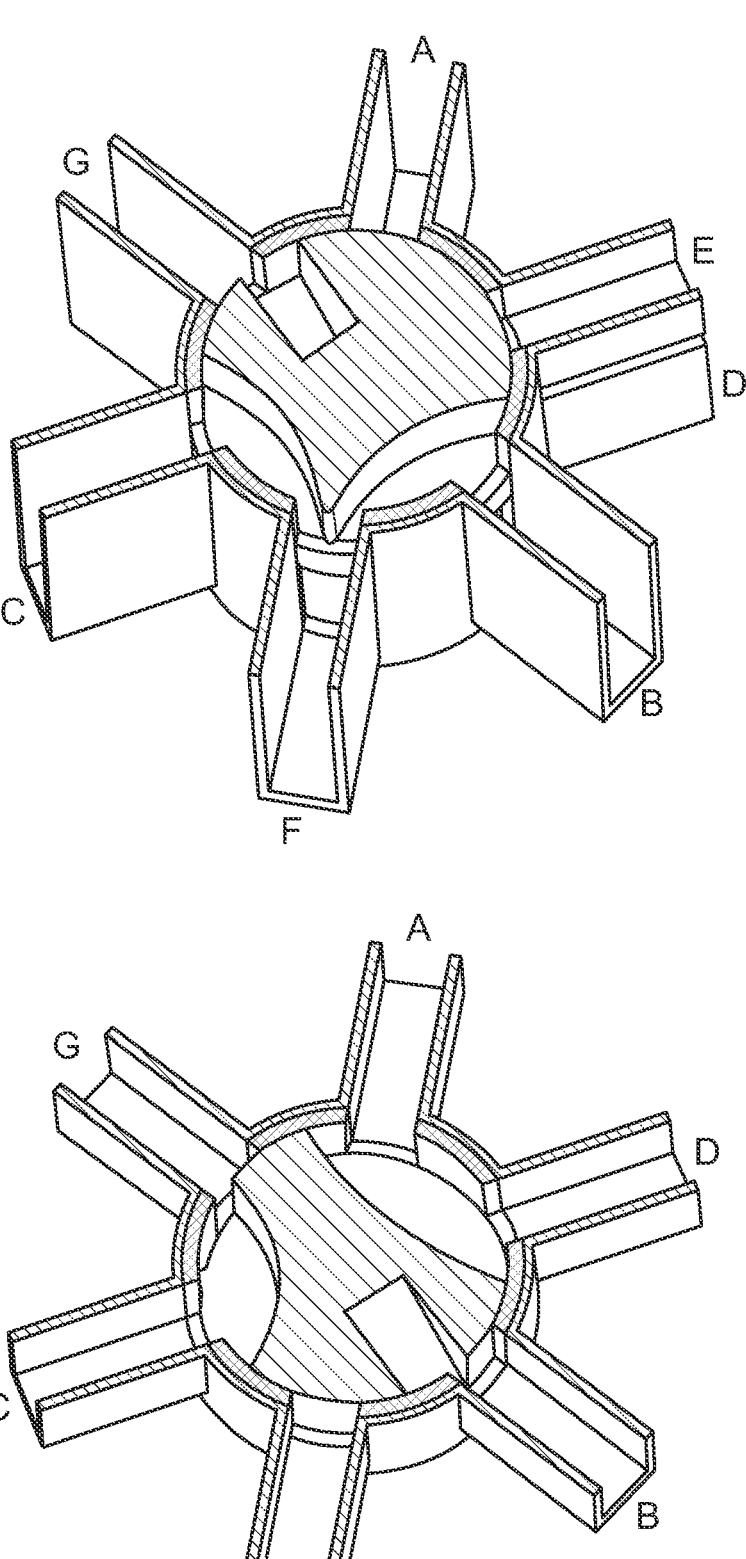
FIG. 13a shows the two planes of the multiway valve in a representation, analogous to FIGS. 2b and 2c, with the valve body in an eleventh rotational position.
Figure 13B:
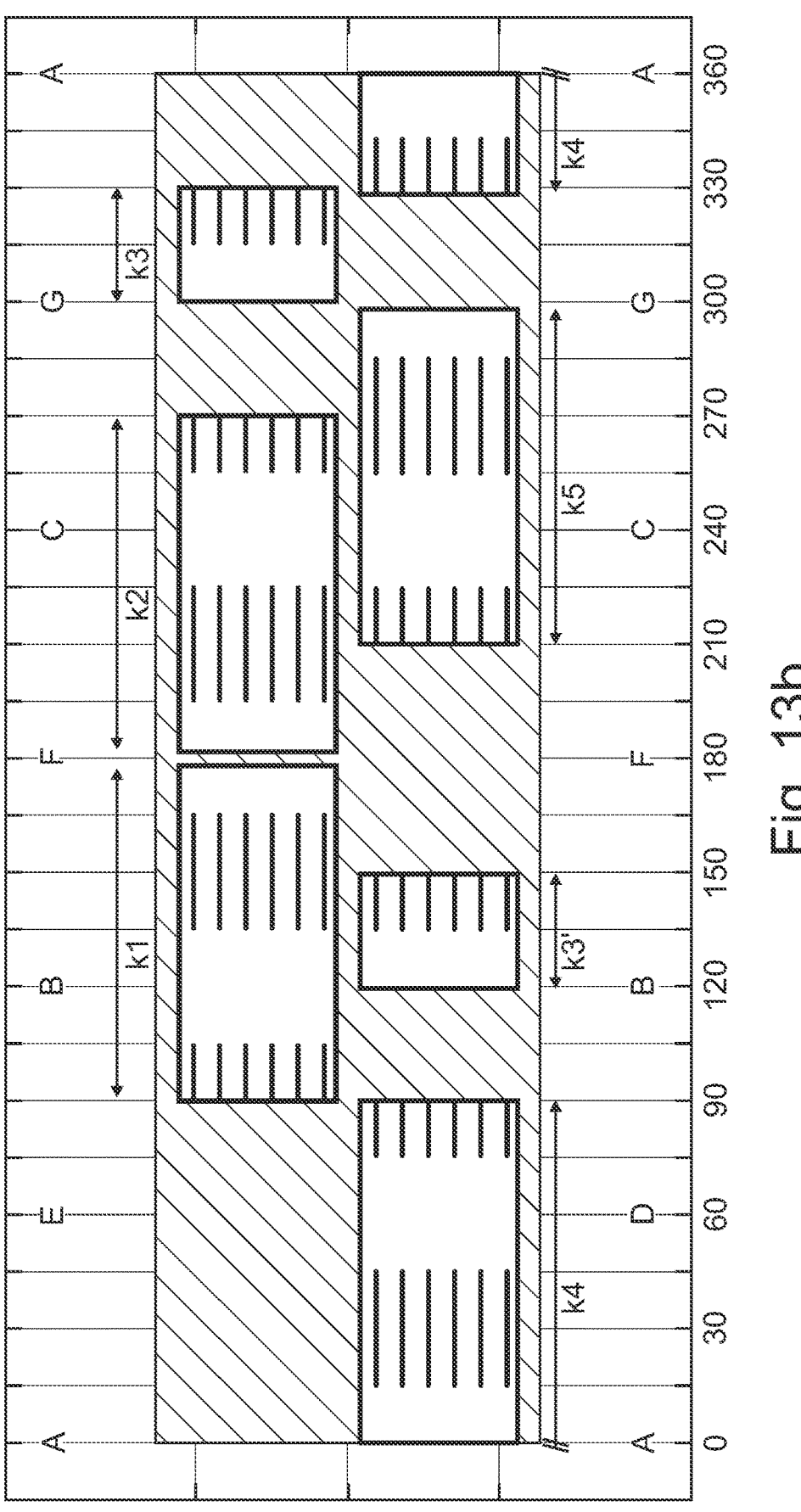
FIG. 13b shows the contact surface, corresponding to FIG. 13a, between the valve body and the housing with the seal in a development view.
Figure 13C:
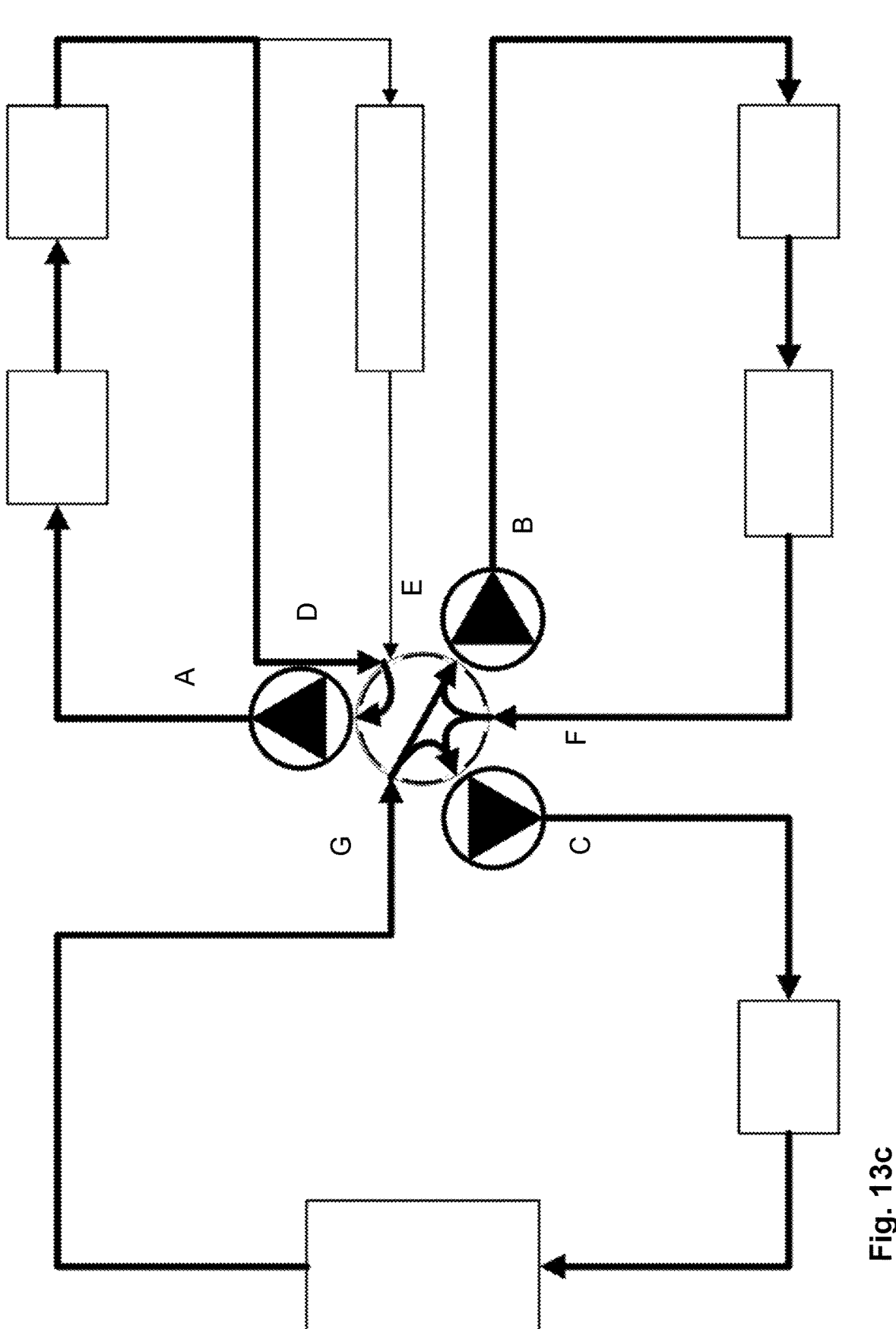
FIG. 13c shows the thermal management system in a representation, analogous to FIG. 1, in an operating state corresponding to the eleventh rotational position of the valve body.

In addition to the above-described ten operating states of thermal management system 2, it is possible by means of multiway valve 34 to realize intermediate states which allow a proportional distribution of the coolant flows between circuits 6, 18, 26. FIGS. 13a to 13c show by way of example an eleventh operating state of thermal management system 2 corresponding to an eleventh rotational position of valve body 40 of multiway valve 34. This eleventh operating state corresponds to a mixed state between the second and third operating states. See FIGS. 4a to 4c for the second operating state and FIGS. Sa to 5c for the third operating state in this regard. In the eleventh operating condition, the pairs corresponding to the following housing openings are fluidically connected to each other as follows: F and B by second connection channel 52, F and C by second connection channel 54, G and B by third connection channel 56, D and A by first connection channel 48, and G and C by first connection channel 46.

Accordingly, the eleventh operating state establishes the connections D to A, F to B and C, and G to B and C. In one respect, this corresponds to a separate flow through drive circuit 18 using bypass 24. Furthermore, in the eleventh operating state, there is a connection of the fluid flows, therefore, the coolant flows, between battery circuit 6 and climate control circuit 26 to form an overall circuit.

That is, the fluid flow, therefore, the coolant flow, in climate control circuit 26 is circulated partially separated from battery circuit 6 and simultaneously partially directed to battery circuit 6. Similarly, the fluid flow, therefore, the coolant flow, on the one hand, circulates in battery circuit 6 partially separated from climate control circuit 26 and, on the other hand, this fluid flow is simultaneously partially returned to climate control circuit 26. The ratio of the partial flows in circuits 6 and 26, namely, the ratio of a partial flow in only one of the circuits 6 and 26 to a partial flow which is divided between fluidically connected circuits 6 and 26, is realized by continuously adjusting the rotational position of valve body 40 and thus the operating state of thermal management system 2 between the second and third operating states. Consequently, the eleventh operating state, shown by way of example, can be used advantageously, for example, to use the heat of heater 30 in climate control circuit 26 both for heating the vehicle interior via heat exchanger 32 and simultaneously for heating traction battery 4 in battery circuit 6. The continuous adjustment of the rotational position of valve body 40 of multiway valve 34 between the second and third rotational position of valve body 40 is thereby used to control the heat release to battery circuit 6.

By means of thermal management system 2 with multiway valve 34 and the described method, it is thus possible to control a plurality of external flow channels of a fluid system with a plurality of fluid circuits in a simple manner in terms of design and circuit technology. Accordingly, it is possible to reduce a plurality of conventional multiway valves and replace them with only one multiway valve of the invention, namely, multiway valve 34. Accordingly, the assembly effort and costs as well as the required installation space are reduced.

The invention is not limited to the present exemplary embodiment. For example, the invention can also be used advantageously in other types of vehicles. In particular, the invention is not limited to the details of the present exemplary embodiment.

Figure 14A:
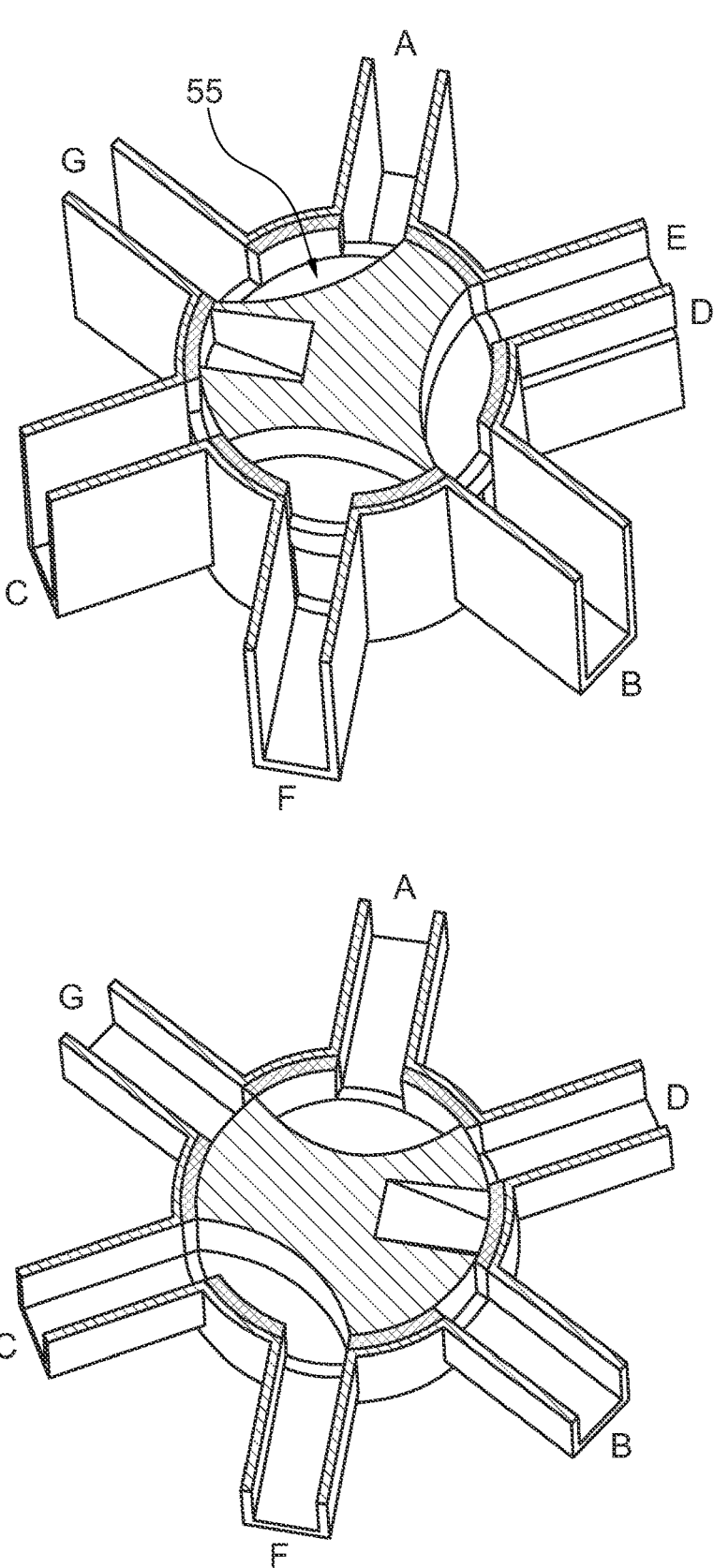
FIG. 14*a* shows an example of the multiway valve of the invention in a representation, analogous to FIGS. 2*b* and 2*c*, in a first rotational position.
Figure 14B:
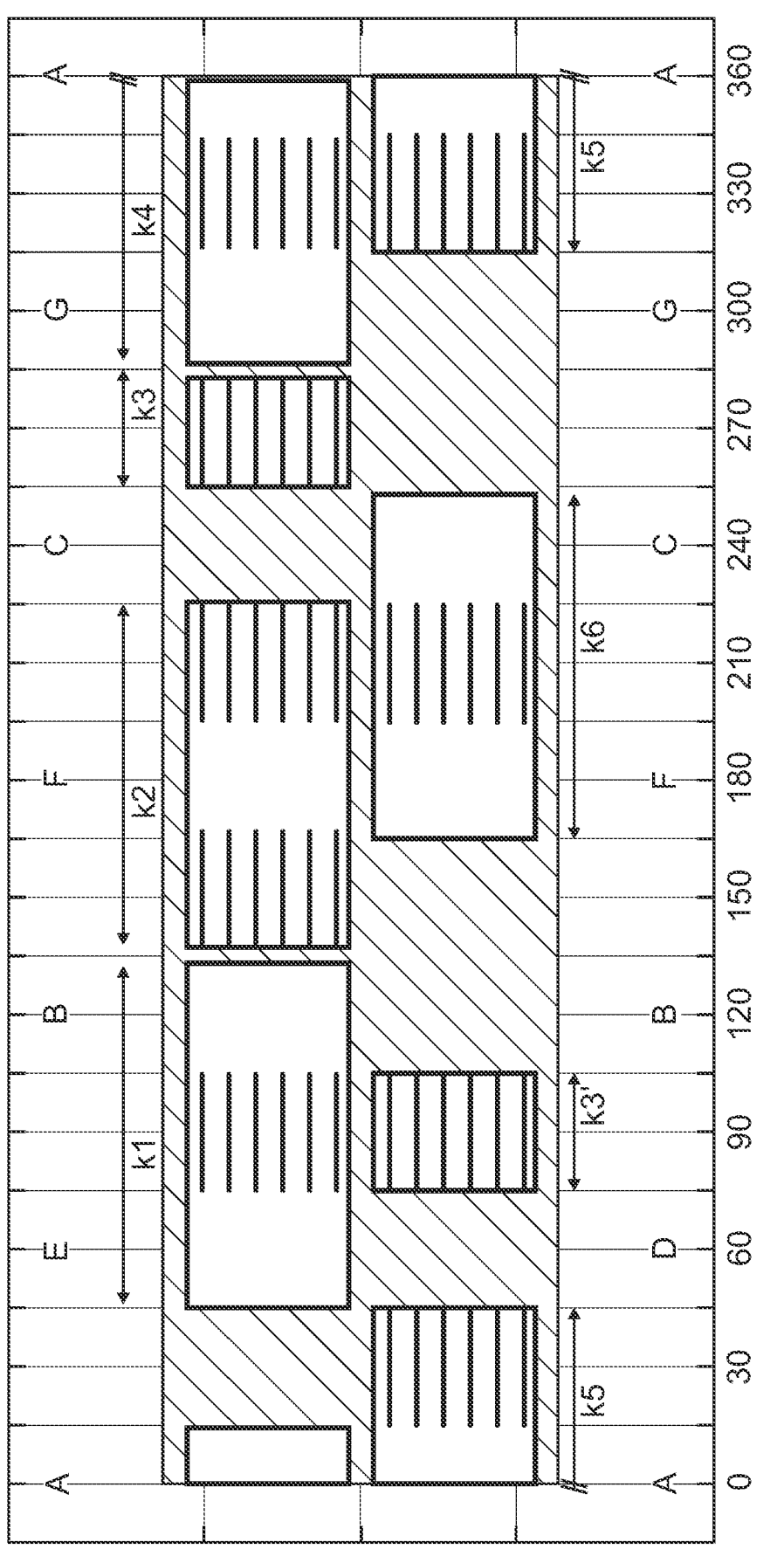
FIG. 14*b* shows the contact surface, corresponding to FIG. 14*a*, between the valve body and the housing with the seal in a development view.

For example, it is possible to vary the above-described geometry of the multiway valve of the invention. See also the relevant explanations in the description of the specific exemplary embodiment in this regard. For example, interchanging the upper and lower planes of valve body 40 is conceivable. Accordingly, first plane 44 may take the place of second plane 50 and second plane 50 may take the place of first plane 44. Furthermore, the variant of multiway valve 34 briefly explained according to FIGS. 14a and 14b is conceivable. For example, the valve body of multiway valve 34 can be modified as is evident from FIGS. 14a and 14b. Of course, other modifications are also conceivable; the skilled artisan will select the suitable geometry for the multiway valve of the invention, therefore, the housing as well as the seal and/or the valve body, depending on the requirements of the individual case. Purely by way of example, reference is made here only to the further possibility that the valve body can be formed, for example, mirrored along the vertical sectional plane centrally by the third connection channel, formed as a central channel, to the present exemplary embodiment along with the variant according to FIGS. 14a and 14b.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multiway valve for an electric vehicle, the multiway valve comprising:

a housing with at least six housing openings, each for fluidically connecting to an external flow channel for a fluid;

a valve body rotatably disposed in the housing about an axis of rotation for fluidically connecting at least two of the housing openings of the housing;

a seal with seal openings that correspond to the housing openings in the housing is arranged between the housing and the valve body for sealing the fluidic connection with respect to the open environment, wherein a housing opening and corresponding seal openings form at least one pair, and wherein the valve body has a first plane, which comprises at least two first connection channels, and has a second plane, which is parallel to the first plane and which comprises at least two second connection channels, wherein the first and second connection channels are fluidically separated from each other and can be fluidically connected to at least two of the housing openings of the housing by rotating the valve body into a respective previously determined rotational position of the valve body, wherein the at least one pair of the housing opening and the corresponding seal openings extend over the first and second planes such that the at least one pair is fluidically paired with the first plane comprising the first connection channels and with the second plane comprising the second connection channels and, depending on the rotational position of the valve body, are fluidically connected to at least one of the first or the second connection channels without any reduction in cross section, relative to a flow from the respective connection channel in a direction of the at least one pair, and wherein at least two other pairs that each include a housing opening and a corresponding seal opening are arranged one above the other such that one of the at least two other pairs is fluidically paired with the first plane comprising the first connection channels and the other of the at least two other pairs is fluidically paired with the second plane comprising the second connection channels.

2. The multiway valve according to claim 1, wherein the at least one pair of the housing opening and the corresponding seal openings that extend over the first and second planes comprise a plurality of pairs that extend over the first and second planes and are provided such that the plurality of pairs are fluidically paired with the first plane comprising the first connection channels and with the second plane comprising the second connection channels, and, depending on the rotational position of the valve body, are fluidically connected to at least one of the first or the second connection channels without any reduction in cross section, relative to a flow from the respective connection channel in the direction of the plurality of pairs.

3. A multiway valve for an electric vehicle, the multiway valve comprising:

a housing with at least six housing openings, each for fluidically connecting to an external flow channel for a fluid;

a valve body rotatably disposed in the housing about an axis of rotation for fluidically connecting at least two of the housing openings of the housing;

a seal with seal openings that correspond to the housing openings in the housing is arranged between the housing and the valve body for sealing the fluidic connection with respect to the open environment, and wherein the valve body has a first plane, which comprises at least two first connection channels, and has a second plane, which is parallel to the first plane and which comprises at least two second connection channels, wherein the first and second connection channels are fluidically separated from each other and can be fluidically connected to at least two of the housing openings of the housing by rotating the valve body into a respective previously determined rotational position of the valve body, wherein at least one pair of the housing openings and the corresponding seal openings extend over the first and second planes such that the at least one pair is fluidically paired with the first plane comprising the first connection channels and with the second plane comprising the second connection channels and, depending on the rotational position of the valve body, are fluidically connected to at least one of the first or the second connection channels without any reduction in cross section, relative to a flow from the respective connection channel in a direction of the at least one pair, wherein at least two other pairs of housing openings and corresponding seal openings are arranged one above the other such that one of the at least two other pairs is fluidically paired with the first plane comprising the first connection channels and the other of the at least two other pairs is fluidically paired with the second plane comprising the second connection channels, and wherein, for fluidically connecting the housing openings of the at least two other pairs, the valve body additionally has at least one third connection channel, which is fluidically separated from the first and second connection channels, and wherein the third connection channel extends over the first and second planes, such that the third connection channel is formed as a central channel.

4. The multiway valve according to claim 3, wherein the at least two other pairs, arranged one above the other, and the third connection channel are designed to match one another such that the third connection channel is fluidically connected to at least one of the at least two other pairs.

5. The multiway valve according to claim 2, wherein the plurality of pairs are arranged symmetrically about the axis of rotation of the valve body such that centers of gravity of the plurality of pairs are positioned at 0°, at 60°, at 120°, at 180°, at 240°, and at 300°.

6. The multiway valve according to claim 1, wherein an extension of the at least one pair of the housing opening and the corresponding seal openings, relative to the axis of rotation of the valve body corresponds to an angle of 30°.

7. The multiway valve according to claim 3, wherein the first and second connection channels have extensions, which, relative to the axis of rotation of the valve body and a contact surface of the valve body with the seal, correspond to the following angle groups a) 90°; or b) partly 120°, partly 90°, or wherein the at least one third connection channel has an extension which, relative to the axis of rotation of the valve body and the contact surface of the valve body with the seal corresponds to an angle of 30°.

8. The multiway valve according to claim 1, wherein the at least one pair of the housing opening and the corresponding seal openings and the valve body with the connection channels are designed to match each other such that a fluid flowing in through one of the housing openings is distributed to at least two other housing openings via the valve body depending on the rotational position of the valve body.

9. A thermal management system for an electric vehicle, the thermal management system comprising:

a controller;

a battery circuit thermally conductively connected to a traction battery of the electric vehicle;

a drive circuit thermally conductively connected to at least one of an electric drive of the electric vehicle or power electronics for the electric drive; and a climate control circuit thermally conductively connected to a vehicle interior of the electric vehicle, wherein the battery circuit, the drive circuit, and the climate control circuit are each operable with a coolant and are connected to or disconnected from one another via at least one controllable coolant valve, and wherein the at least one coolant valve is a single multiway valve according to claim 1.

10. The thermal management system according to claim 9, wherein the multiway valve has a total of seven pairs of housing openings and the corresponding seal openings, wherein the drive circuit is fluidically connected to three of the aforementioned pairs, and wherein the battery circuit and the climate control circuit are each connected to two of the aforementioned pairs.

11. A method for operating a thermal management system for an electric vehicle, the method comprising:
providing the thermal management system according to claim 10; and
fluidically connecting or disconnecting the battery circuit, the drive circuit, and the climate control circuit from one another via the multiway valve as a function of the control of the multiway valve.

12. The method according to claim 11, wherein the battery circuit, the drive circuit, and the climate control circuit are fluidically connected to one another by the multiway valve as a function of the control of the multiway valve, or wherein coolant flows through the battery circuit, the drive circuit, and the climate control circuit independently of one another via the multiway valve as a function of the control of the multiway valve.

13. The method according to claim 11, wherein the battery circuit and the climate control circuit are fluidically connected to each other via the multiway valve as a function of the control of the multiway valve, and at the same time coolant flows through the drive circuit independently of the battery circuit and the climate control circuit, or wherein the drive circuit and the climate control circuit are fluidically connected to each other via the multiway valve as a function of the control of the multiway valve, and at the same time coolant flows through the battery circuit independently of the drive circuit and the climate control circuit or, wherein the battery circuit and the drive circuit are fluidically connected to each other via the multiway valve as a function of the control of the multiway valve and at the same time coolant flows through the climate control circuit independently of the battery circuit and the drive circuit.

14. The method according to claim 11, wherein the coolant flowing into the multiway valve from the battery circuit, the drive circuit, or the climate control circuit is only partially introduced into at least one of the other two circuits via the multiway valve or is partially or completely distributed to the other two circuits.

15. The method according to claim 11, wherein the coolant of the drive circuit flows only as a function of the control of the multiway valve through a radiator of the drive circuit which radiator is thermally conductively connected to an open environment of the thermal management system, or through a bypass of the drive circuit which bypass is connected in parallel to the radiator of the drive circuit.

* * * * *